United States Patent
Li et al.

(10) Patent No.: US 11,270,253 B2
(45) Date of Patent: Mar. 8, 2022

(54) COGNITIVE PROCUREMENT

(71) Applicant: ACCENTURE GLOBAL SOLUTIONS LIMITED, Dublin (IE)

(72) Inventors: Chung-Sheng Li, San Jose, CA (US); Guruprasad Dasappa, Bangalore (IN); Krishna Kummamuru, Bangalore (IN); Colin Connors, Campbell, CA (US); Guanglei Xiong, Pleasanton, CA (US); Christopher Banschbach, Wilmington, DE (US); Thomas Michael Fahey, Wynnewood, PA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 302 days.

(21) Appl. No.: 16/241,749

(22) Filed: Jan. 7, 2019

(65) Prior Publication Data
US 2020/0219040 A1    Jul. 9, 2020

(51) Int. Cl.
  *G06Q 30/00* (2012.01)
  *G06Q 10/08* (2012.01)
  *G06Q 30/02* (2012.01)
  *G06N 5/04* (2006.01)
  *G06F 16/903* (2019.01)
  *G06Q 10/06* (2012.01)

(52) U.S. Cl.
  CPC ......... *G06Q 10/087* (2013.01); *G06F 16/903* (2019.01); *G06N 5/04* (2013.01); *G06Q 10/0635* (2013.01); *G06Q 30/0202* (2013.01)

(58) Field of Classification Search
  CPC ... G06Q 30/0601–0645; G06Q 10/087; G06Q 10/0635; G06Q 30/0202; G06F 16/903; G06N 5/04

USPC ............................................... 705/26.1–27.2
See application file for complete search history.

(56) References Cited

U.S. PATENT DOCUMENTS

2017/0293917 A1*  10/2017  Dhurandhar  ........... G06N 7/005
2018/0165585 A1*   6/2018  Saxena  .................. G06N 5/041

OTHER PUBLICATIONS

Paul Milgrom et al, How Artificial Intelligence and Machine Learning Can Impact Market Design NBER Working Paper Series, Feb. 2018 (Year: 2018).*

* cited by examiner

*Primary Examiner* — Kathleen Palavecino
(74) *Attorney, Agent, or Firm* — Mannava & Kang, P.C.

(57) ABSTRACT

Examples of cognitive procurement and proactive continuous sourcing are defined. In an example, the system receives a procurement request. The system implements an artificial intelligence component to sort the supplier data into a plurality of domains. The system modifies a domain from the plurality of data domains based on new supplier data being received. The system generates user procurement behavior data based on the procurement interaction and a domain from the plurality of data domains. The system establishes a user procurement behavior model corresponding to a guideline associated with the procurement interaction. The system determines whether the user procurement behavior model should be updated based on modification in the plurality of data domains and updates the same. The system notifies the user regarding change in the user procurement behavior model due to change in a domain of the received supplier data selected by the user.

18 Claims, 17 Drawing Sheets

COGNITIVE PROCUREMENT

BACKGROUND

Procurement's importance as a key business process has increased significantly in recent times. Originally, procurement started as a way to integrate purchasing into supply chain management at a time when most large companies were struggling to manage their operational costs. Currently procurement process starts with a buyer making a procurement request, and the procurement agent consulting with the market intelligence reports. These reports may be, for example, a supplier or category intelligence report, and may help a reader use the market intelligence to make the supplier selection for the specific category. In many cases, the available report is simply out of date. On demand report generation is becoming feasible with the assistance of automation and various information retrieval and information extraction capabilities.

The business environment has been becoming an "always on" environment. Further, reactive synthesis of market intelligence based on the request of the buyer or procurement agent may not be consistent with the expectation of the business. Corporate procurement processes frequently use contract management and sourcing software applications to increase procurement efficiency and to create cost savings. However, most of these applications are demand driven, which may constrain the efficiency of the corporate procurement processes because such corporate procurement processes may be not be optimized in the world of "always on" where the market landscape, technology disruption, and supplier situation constantly evolve.

Accordingly, a technical problem with the currently available procurement processes is that they may be inefficient, inaccurate, and/or not scalable. There is a need for an optimized procurement model that is capable of continuous sourcing paradigm, which includes the constant sensing of emerging risks and opportunities, the evaluation of recommendations, and the rapid action/engagement with suppliers to negotiate best outcomes.

DETAILED DESCRIPTION

Figure 1:
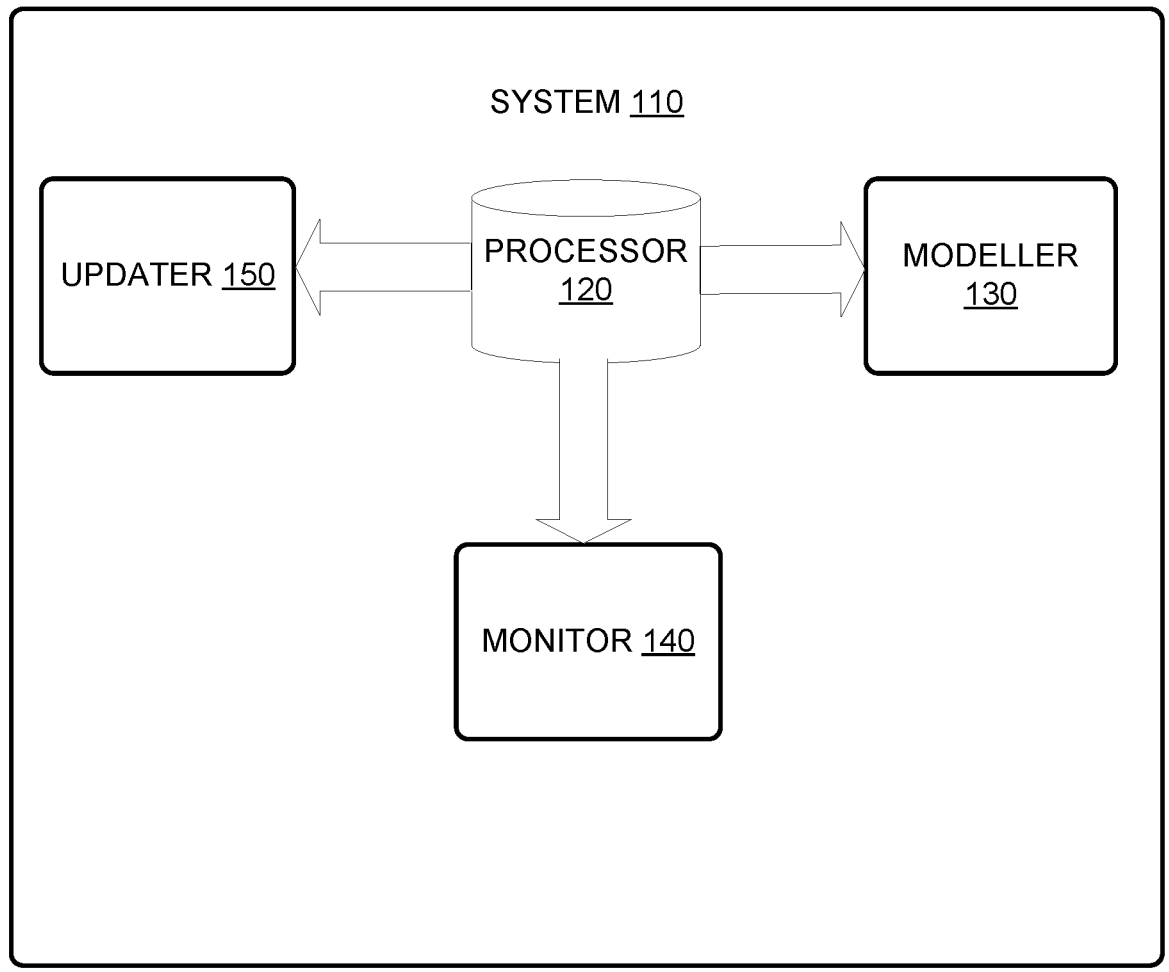
FIG. 1 illustrates a diagram for system for cognitive procurement and proactive continuous sourcing, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes a system and method for cognitive procurement and proactive continuous sourcing (CPPCS). The cognitive procurement and proactive continuous sourcing is referred to as the system hereafter, for simplicity. The system may record procurement requests sent by a user at various times, and record outcomes of the procurement requests for future reference purpose. The system may screen various suppliers and select a supplier to award a contract to or obtain bids from suppliers based on procurement requirements. The system may justify a supplier selection for a procurement request. This justification may be based on various factors such as, for example, operational costs, risks, previous collaborations and the like.

In accordance with an example of present disclosure the system described herein may include a processor. The processor may be coupled to a modeler, a monitor and an updater. The modeler may receive supplier data from a plurality of data sources. The modeler may implement an artificial intelligence component to sort the supplier data into a plurality of data domains. The artificial intelligence component may be one of a data extractor, a data classifier, a data associator, a data comparer, a relationship extractor, a dependency parser and the like. In an example, the system further comprise using the artificial intelligence component for researching at least one of a supplier availability, a supplier performance, a supplier capability, an innovation assessment, a risk assessment, a technology assessment, and a supplier collaboration from the received supplier data. The modeler may also modify a domain from the plurality of data domains of the supplier data based on new supplier data. In an example, the modeler may unify domains from the plurality of data domains of the supplier data for identifying clusters of suppliers with similar performance.

In an example, a procurement interaction may be received from a user, for instance, by a monitor. The procurement interaction may indicate a query sent by the user to the system for processing procurement of goods and services. A user procurement behavior data may be generated based on the procurement interaction and a domain from the plurality of data domains of the supplier data. The procurement behavior data may be a domain from the plurality of data domains selected by the user specific to the procurement interaction. In an example, the procurement interaction of the user further comprises at least one of screening historical procurement requests, investigating cost fluctuations, developing requests for proposals, tracking for promotions, setting up procurement recommendations, monitoring procurement guidelines being adhered to, and monitoring acquisition of goods, services, or information.

The procurement behavior data and the supplier data set may be received, for instance, by an updater. The updater may establish a user procurement behavior model corresponding to a guideline associated with the procurement interaction of the user. The user procurement behavior model may be established by performing a cognitive learning operation on a domain from the plurality of data domains of the received supplier data and the received user procurement behavior data. The updater may determine whether the user procurement behavior model should be updated based on modification in the plurality of data domains of the supplier data and modification of the user procurement behavior data.

The user procurement behavior model may be updated based on modification in the plurality of data domains of the supplier data and modification of the user procurement behavior data. The user may be notified when there is a change in the user procurement behavior model due to change in a domain from the plurality of data domains of the received supplier data selected by the user. In an example, the updater may provide result of the procurement interaction of the user as a cognitive insight. The updater may implement the cognitive insight provided for the procurement interaction. The updater may be configured to associate the user procurement behavior model with the cognitive insight. The updater may also provide evidence of establishing the user procurement behavior model made by performing the cognitive learning operation on a domain from the plurality of data domains of the received supplier data and the received user procurement behavior data.

In accordance with example of the present disclosure the system may further include a guideline being associated with the procurement interaction of the user is an interaction with a data source of suppliers from the plurality of data sources. Further, an electronic document in response to the guideline associated with the procurement interaction of the user may also be generated.

In operation, a procurement request from a user may be detected. Further, supplier intelligence using various sources for processing the procurement request may be gathered. The sources may include external sources like market intelligence reports, various external databases, or internal sources like previous histories of supplier interaction and the like. The supplier intelligence may be sorted into various categories and category intelligence operations are performed over supplier data. This aggregates the information across multiple suppliers and provide explanations for the same. The information may include supper histories, cost fluctuations, previous collaborations, current conflicts, compliance issues, operational costs and the like. The system then runs cognitive operations on supplier data selects suppliers to obtain bids for the procurement requests. The system then assists the user with bid selection and procurement request completion.

According to another aspect of the present disclosure, procurement requests may be managed. In an example, a system for submission of procurement requests may be provided, procurement request data may be collected, the request data in a database may be stored, a user of the procurement request may be alerted, the user to transfer data from the procurement request into an RFX may be enabled. For the purpose of explanation and not as a limitation, the term RFX is used as general term to include all references to Request for Information (RFI), Request for Proposal (RFP), Request for Quote (RFQ), and Request for Bid (RFB).

In another example, the present disclosure enables a user to create request templates, for instance, using existing User Defined Fields (UDFs). The user may also ne enabled to customize request status to better describe the state of the request.

In an example, the present disclosure provides for proactive continuous sourcing. For proactive continuous sourcing, information across multiple suppliers may be aggregated and a supplier on various pre-defined categories may be monitored. In an example, monitoring my include contract compliance, innovation index, technological index, operation costs, operational risks, ethical implications and the like. In another example, the monitoring may trigger actions in contract process steps, e.g., notifications, payments, penalties, or disputes.

In yet another example, the present disclosure may provide for monitoring of market changes for a category from supplier data, to trigger a procurement request from a user. The system may include expanding supplier data. In an example, the expansion may be carried out through automated discovery of vendors with similar capabilities.

In another example, suppliers according to highest return on value for carrying out a procurement request from a user may be selected. The system provides an evidence supporting selections made using an artificial intelligence (AI) component. In an example, the artificial intelligence component may be a data extractor, a data classifier, a data associator, a data comparer, a relationship extractor, or a dependency parser.

In accordance with an example of present disclosure, the system may be configured to carry our strategic sourcing for a user. The strategic sourcing may include selecting suppliers who have recently lowered prices for their goods and services, suppliers who have recently upgraded their technology, suppliers who have recently changed their policies that may positively impact a procurement request from a user.

In accordance with an example of present disclosure, the system may include continuous monitoring and modification of procurement and supplier data. The system may implement the artificial component described above in conjunction with the cognitive operations describes above for managing procurement requests. In an example, category intelligence, which has been applied to supplier data may be modified based on changes in procurement behavior. The system may determine if there needs to be a modification in procurement behavior of a user based on modification supplier intelligence. This system the presents the determined results for user perusal, thereby assisting the user in decision making regarding a procurement request. The details would be described with help of figures in following section of this specification.

Accordingly, the present disclosure aims to make the tedious tasks of compiling supplier intelligence and making supplier decisions easier and more efficient. The present disclosure provides for efficient and continuous analysis of the supplier data, which in turn provides for continuous, efficient and accurate analysis of the procurement request of a user. The system may be configured to support human decision making for processing a procurement request. Furthermore, the system may then analyse various categories of supplier data, based on the procurement behavior models to accurately interpret the transactional documents. Because system may capture all relevant elements (processes and/or features) of a guideline and the subsequent analysis of a transactional document may be performed based on knowledge models corresponding to the elements, the analysis may be substantially free from errors.

FIG. 1 illustrates a system for cognitive procurement and proactive continuous sourcing 110 (referred to as system 110 hereinafter), according to an example implementation of the present disclosure. In an example, the system 110 may include a processor 120. The processor 120 may be coupled to a modeler 130, a monitor 140 and an updater 150.

In an example, the modeler 130 may be configured to receive supplier data from a plurality of data sources. In an example, the plurality of data domains further comprises researching at least one of the features, benefits, cost, availability, location, delivery method of goods, services, and information, innovation assessment, risk assessment, technology assessment, supplier collaboration from receive supplier data and the like. The modeler 130 may be further configured to implement an artificial intelligence component to sort and analyse the supplier data into a plurality of data domains. The artificial intelligence component may be one of a data extractor, a data classifier, a data associator, a data comparer, a relationship extractor, and a dependency parser and the like (further explained by way of FIG. 2).

The modeler 130 may be further configured to modify a domain from the plurality of data domains of the supplier data based on new supplier data being received continuously. The modeler 130 may derive category intelligence from analysis of the plurality of data domains. The category intelligence may include analysis of the internal data including supplier bid submission timeliness, supplier bid usage and supplier on-time performance for processing a procurement request from a user. The system 110 may include processing a supplier bid selection that is driven by overall business and strategic value based on the entire life-cycle of the procurement request, not just its initial purchase price.

In an example, the modeler 130 may unify domains from the plurality of data domains of the supplier data for identifying clusters of suppliers with similar performance and behavior for processing a procurement request from a user. For example, there may be suppliers, which have been exhibiting similar behavior in terms of bid submission timeliness, supplier bid usage and supplier on-time performance, benefits, cost, availability, location, delivery method of goods, services, and information, innovation assessment, risk assessment, technology assessment, supplier collaboration from receive supplier data and the like. The modeler 130 may identity similar behavior patterns and group such suppliers together for purpose of a procurement request. These groups may also be referred to as supplier clusters.

In an example, the monitor 140 may be configured to receive a procurement interaction from a user. The procurement interaction may indicate a query sent by the user to the system 110 for processing procurement of goods and services. The procurement interaction of the user may further comprise at least one of screening historical procurement requests, investigating cost fluctuations, developing requests for proposals, tracking for promotions, setting up procurement recommendations, monitoring procurement guidelines being adhered to, and monitoring acquisition of goods, services, or information.

The monitor 140 may generate user procurement behavior data based on the procurement interaction and a domain from the plurality of data domains of the supplier data. The procurement behavior data may be a domain from the plurality of data domains selected by the user specific to the procurement interaction. In an example, the procurement interaction of the user further comprises at least one of screening a historical procurement requests, investigating a cost fluctuation, developing a requests for proposals, tracking a promotions, setting up a procurement recommendation, monitoring adherence to a procurement guidelines, and monitoring acquisition of a goods, services, or information.

In an example, the updater 150 may be configured to receive the supplier data set from the modeler 130. The updater 150 may be configured to receive the procurement behavior data from the monitor 140. The updater 150 may be configured to establish a user procurement behavior model corresponding to a guideline associated with the procurement interaction of the user. The guideline associated with the procurement interaction of the user may be an interaction with a data source of suppliers from the plurality of data sources. For example, the guideline may be a query to interact with an external database like LinkedIn® database for obtaining personnel details for a supplier. In an example, the guideline may be to interact with an internal database for at least one of screening historical procurement requests, investigating cost fluctuations, developing requests for proposals, tracking for promotions, setting up procurement recommendations, monitoring procurement guidelines being adhered to, and monitoring acquisition of goods, services, or information.

The user procurement behavior model may be established by performing a cognitive learning operation on a domain from the plurality of data domains of the received supplier data and the received user procurement behavior data. The updater 150 may determine whether the user procurement behavior model should be updated based on modification in the plurality of data domains of the supplier data and modification of the user procurement behavior data. The updater 150 may be configured to update the user procurement behavior model based on modification in the plurality of data domains of the supplier data and modification of the user procurement behavior data. The updater 150 may be configured to notify the user when there is a change in the user procurement behavior model due to change in a domain from the plurality of data domains of the received supplier data selected by the user.

In an example, the updater 150 may be configured to provide result of the procurement interaction of the user as a cognitive insight. The updater 150 may be further configured to implement the cognitive insight provided for the procurement interaction. The updater 150 may be configured to associate the user procurement behavior model with the cognitive insight. In an example, the cognitive insight may include selecting which suppliers to obtain bids from for a procurement request.

The updater 150 may further be configured to provide evidence supporting the user procurement behavior model created by performing the cognitive learning operation on a domain from the plurality of data domains of the received supplier data and the received user procurement behavior data. For example, the evidence may be justifying a supplier selection based on price quoted by the supplier for a procurement request, supplier selection based on a technology available with a supplier for a procurement request and the like. Other examples include justifying supplier selection based on previous customer supplier collaboration for a supplier for a procurement request, compliance with policies and regulations for a supplier for a procurement request, innovation index of the supplier and the like.

The justification of supplier selection may be based on screening historical procurement requests, investigating cost fluctuations, developing requests for proposals, tracking for promotions, setting up procurement recommendations, monitoring procurement guidelines being adhered to, monitoring acquisition of goods, services, or information, availability of goods and services as per a procurement request, location, delivery method of goods, services, risk assessment and the like. In an example, updater 150 may select supplier to obtain bids from based on the possible impact on the order fulfillment regarding a procurement request from a user.

The system 110 may further include a generator to generate an electronic document in response to the guideline associated with the procurement interaction of the user. In an example, the guideline may involve identifying a contract with a customer and with a business partner involving in kind arrangement; identifying performance obligations, such as need to deliver goods or services at a certain time to a certain location; determining transaction price, and other such elements.

The system 110 may include supporting human decision making for processing a procurement request. The system 110 may include automating the decision for processing a procurement request. The system 110 may include automating the associated analysis of the supplier data and the categories including competing suppliers for processing a procurement request. The system 110 may include gathering supplier intelligence using various sources for processing a procurement request. The system 110 may include sorting supplier intelligence into various categories and performing category intelligence operations over supplier data for processing a procurement request.

Figure 2:
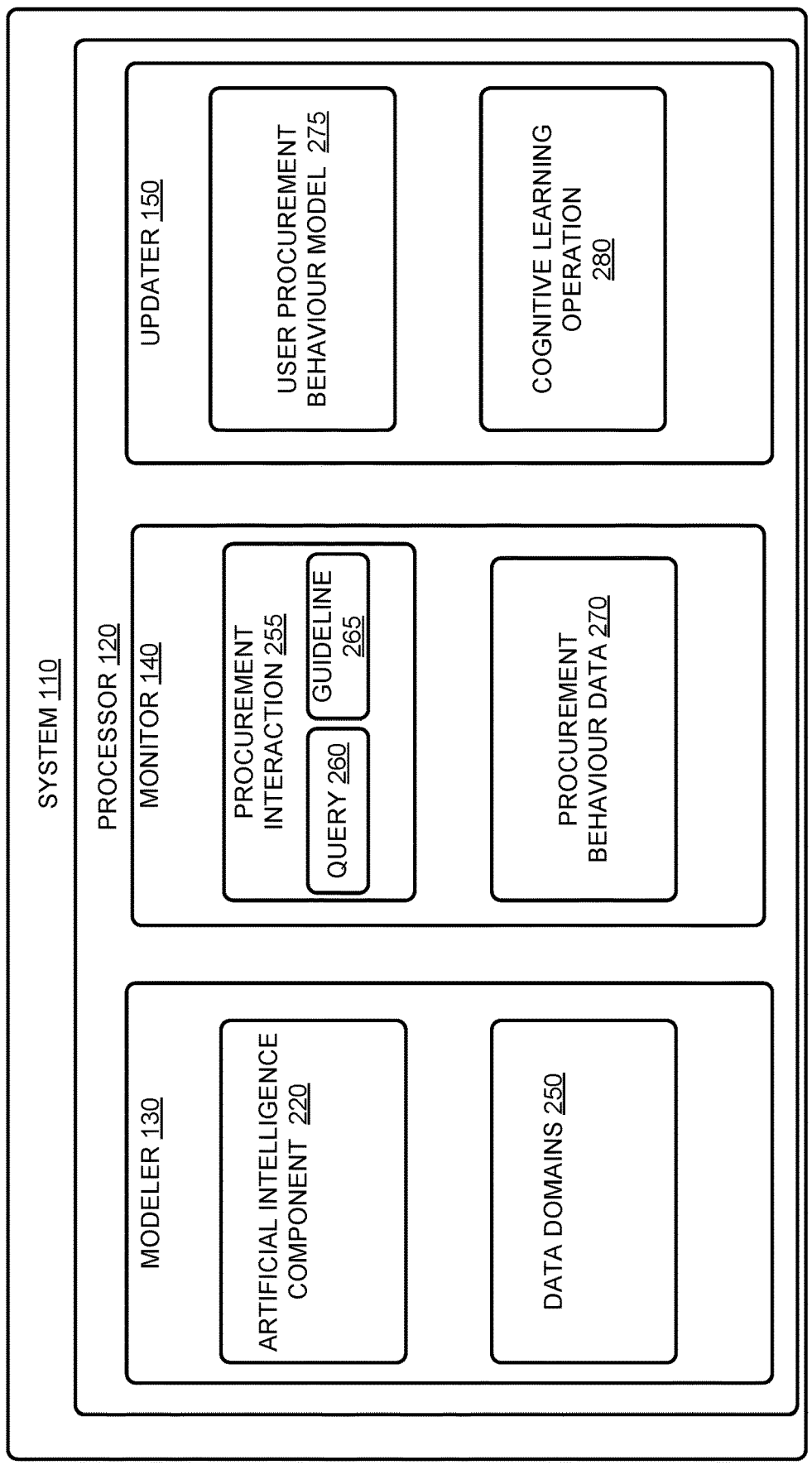
FIG. 2 illustrates various components of the system for cognitive procurement and proactive continuous sourcing, according to an example embodiment of the present disclosure.

FIG. 2 illustrates various components of the system 110 for implementing the system for cognitive procurement and proactive continuous sourcing, according to an example embodiment of the present disclosure.

In accordance with an example of present disclosure the system 110 described herein may include the processor 120. The processor 120 may be coupled to a modeler 130, a monitor 140 and an updater 150. The modeler 130 may be configured to receive supplier data from a plurality of data sources. In an example, the plurality of data domains further comprises researching at least one of the features, benefits, cost, availability, location, delivery method of goods, services, and information, innovation assessment, risk assessment, technology assessment, supplier collaboration from receive supplier data. The modeler 130 may be further configured to implement an artificial intelligence component 220 to sort the supplier data into a plurality of data domains 250. The modeler 130 may be further configured to modify a domain from the plurality of data domains of the supplier data based on new supplier data being received continuously. In an example, the modeler 130 may unify domains from plurality of data domains for identifying clusters of suppliers with similar performance.

The monitor 140 may be configured to receive a procurement interaction 255 from a user. The procurement interaction 255 may indicate a query 260 sent by the user to the system for processing procurement of goods and services. In an example, the procurement interaction 255 of the user further comprises at least one of screening historical procurement requests, investigating cost fluctuations, developing requests for proposals, tracking for promotions, setting up procurement recommendations, monitoring procurement guidelines being adhered to, and monitoring acquisition of goods, services, or information. The procurement interaction 255 may also be referred to as the procurement request 255.

The monitor 140 may generate user procurement behavior data 270 based on the procurement interaction 255 and a domain from the plurality of data domains 250 of the supplier data. The procurement behavior data 270 may be a domain from the plurality of data domains 270 selected by the user specific to the procurement interaction 255. The procurement behavior data 270 may be, for instance, a domain from the plurality of data domains 270 selected by the user specific to the procurement interaction 255. The system 110 may be configured for making an internal database for user procurement behavior data 270. The internal database for user procurement behavior data 270 may include data relevant to multiple users. The database may include providing details that are user specific in nature. In an example, the user procurement behavior data 270 may be monitored by the system 110 for cognitive procurement and proactive continuous sourcing.

The updater 150 may be configured to receive the supplier data set in form of the plurality of data domains 250 from the modeler 130. The updater 150 may be configured to receive the procurement behavior data 270 from the monitor 140. The updater 150 may be configured to establish a user procurement behavior model 275 corresponding to a guideline 265 associated with the procurement interaction 255 of the user. The user procurement behavior model 275 may be established by performing a cognitive learning operation on a domain from the plurality of data domains 250 of the received supplier data and the received user procurement behavior data 270. The updater 150 may determine whether the user procurement behavior model 275 should be updated based on modification in the plurality of data domains 250 of the supplier data and modification of the user procurement behavior data 270.

The updater 150 may be configured to update the user procurement behavior model 275 based on modification in the plurality of data domains 250 of the supplier data and modification of the user procurement behavior data 270. For example, if a supplier has changed their pricing for a particular set of goods or services, the system for cognitive procurement and proactive continuous sourcing may update all user procurement behavior models 270 using this particular supplier information. The user procurement behavior model 270 may be updated as a result of change in the user procurement data 270. The user procurement behavior model 270 may be updated as a result of modification in one of the domains from plurality of data domains 250 of supplier data.

In example, the updater 110 may further include providing evidence supporting establishing of the user procurement behavior model 275 made by performing the cognitive learning operation on a domain from the plurality of data domains 250 of the received supplier data and the received user procurement behavior data 270. The evidence may be early detection of a new innovation in supply market, identifying cost saving opportunities beyond rate reduction and creating a bottom line impact, identifying best in class suppliers and sourcing practices and the like. Many other types of evidence listed by way of FIG. 1, should also be taken into consideration for providing evidence supporting establishing of the user procurement behavior model 275 made by performing the cognitive learning operation on a domain from the plurality of data domains 250 of the received supplier data and the received user procurement behavior data 270.

The updater 150 may be configured to notify the user when there is a change in the user procurement behavior model 275 due to change in a domain from the plurality of data domains 250 of the received supplier data selected by the user.

In an example, the updater 150 may be configured to provide result of the procurement interaction 255 of the user as a cognitive learning operation 280. In an example, the cognitive insight may be a total information analysis of a supplier. The total information analysis of the supplier may include the analysis of supplier behavior, supplier pricing, supplier personnel, supplier relationships with other customers, supplier relationship with current user, supplier innovation indexing, supplier technology indexing, quality of logistics provided by a supplier, overall business and strategic value based on the entire life-cycle of the order, not just its initial purchase price, supplier bid submission timeliness, supplier bid usage, supplier financials, risk associated with a supplier, information about other suppliers with similar behavior, analysis of supplier bid options based on possible impact on the order fulfillment and supplier on-time performance. In an example, the cognitive learning operation 280 may include, one or more of, strategic sourcing for opportunistically engaging with suppliers, providing evidence for recommendations made in bid selection, and providing automated price justification notes for reporting.

The updater 150 may be further configured to implement the cognitive learning operation 280 provided for the procurement interaction 255. In an example, the system 110 may implement the cognitive learning operation 280 in an automated manner based on the user procurement behavior data 270. The system 110 may implement the cognitive learning operation 280 on receiving the guideline 265 as part of the procurement interaction 255.

The updater 150 may be configured to associate the user procurement behavior model 275 with the cognitive learning operation 280. The updater 150 may further be configured to provide evidence of establishing the user procurement behavior model 275 made by performing the cognitive learning operation on a domain from the plurality of data domains 250 of the received supplier data and the received user procurement behavior data 270. For example, if a user exhibits preference for a particular set of data domains from plurality of data domains 250 in order to select suppliers for the procurement request 255, then the system 110 may store it as the user procurement behavior model 275 for the procurement request 255. The system 110 may store many user procurement behavior models like user procurement behavior model 275, each being relevant to the user procurement behavior data 270 pertaining to a single procurement request like procurement request 255.

In an example, the procurement request 255 may be associated with multiple user procurement behavior models like user procurement behavior data 275 based on multiple preferences set by the user. The cognitive operation may include recognizing a pattern that may lead to establishment of the user procurement behavior model 275. The user procurement behavior model 275 may include, for example, hypothetical questions and logical flows to obtain an inference to the hypothetical questions. The user procurement behavior model 275 may be generated specific to an organization, a product category, etc. The user procurement behavior model 275 for the guideline 265 may be stored for further use.

In accordance with an example of the present disclosure the system may further include the guideline 265 being associated with the procurement interaction 255 of the user is an interaction with a data source of suppliers from the plurality of data sources. The system 110 further comprises a generator coupled to the processor, to generate an electronic document in response to the guideline associated with the procurement interaction 255 of the user.

Figure 3:
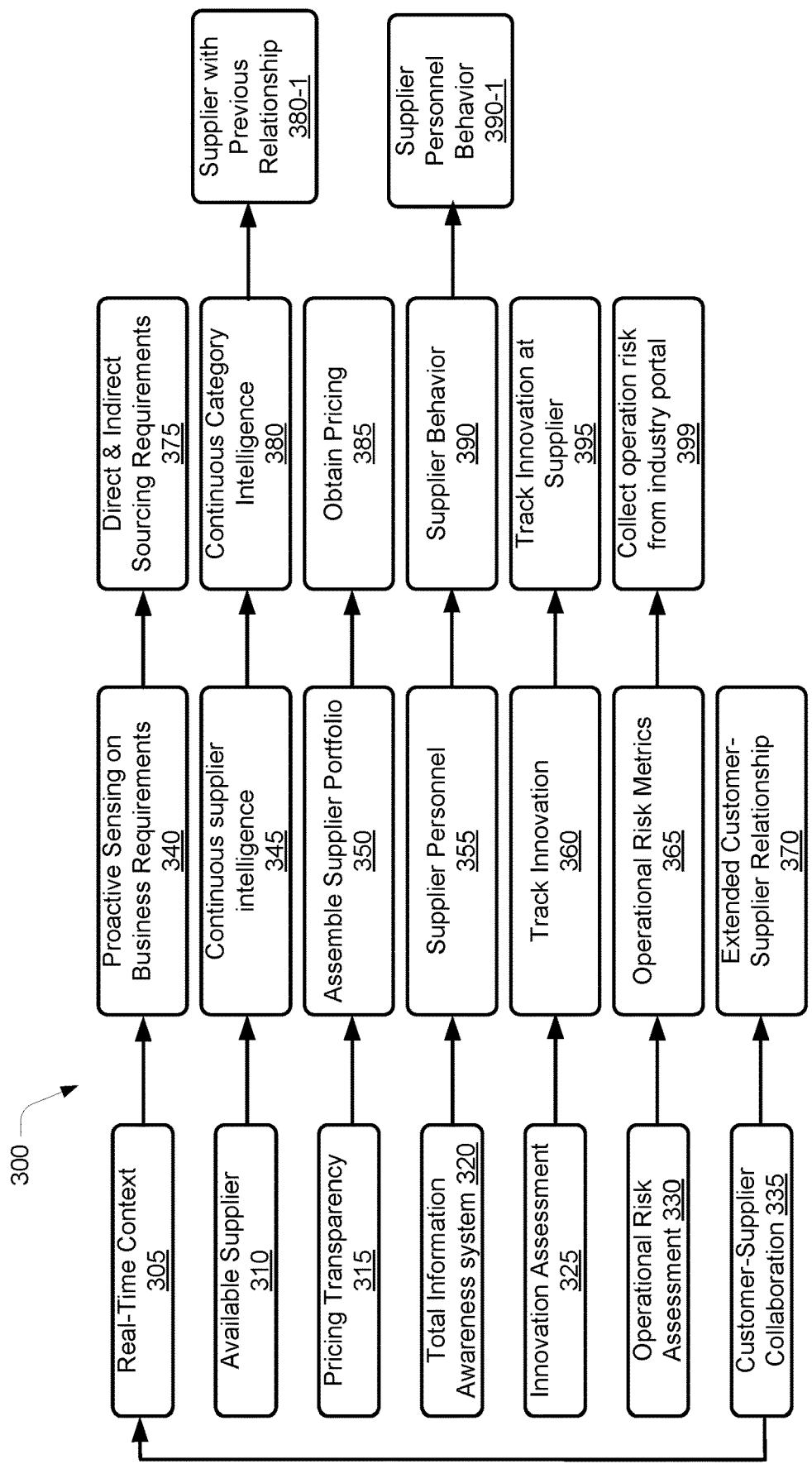
FIG. 3 illustrates key areas of continuous sourcing according to an example embodiment of the present disclosure.

FIG. 3 illustrates a flow diagram 300 presented as an example of the system 110 for cognitive procurement and proactive continuous sourcing according to an example embodiment of the present disclosure.

In an example, the monitor 140 of the system 110 may be configured for receiving procurement request related information from various sources including internet, market intelligence, user history, user input and the like in real time. This may be referred to as real time context 305. The monitor 140 may further include proactive sensing of business requirements 340. Further, the monitor 140 may be configured to track direct and indirect sourcing requirements 375. In an example, the monitor 140 may be configured such that the tracking of the direct and indirect sourcing requirements 375 may lead to the proactive sensing of business requirements 340. Further, the proactive sensing of business requirements 340 may lead to generation of the real time context 305.

The system 110 may be further configured so that the modeler 130 may include a database of available supplier 310. The modeler 130 may be configured such that to gather continuous supplier intelligence 345. The modeler 130 may be configured such that the continuous supplier intelligence 345 may be sorted into various categories. The modeler 130 may include the sorting to be carried out through continuous category intelligence 380. Further, the continuous category intelligence 380 may be based on suppliers with previous relationships 380-1. In an example, the system 110 may be configured so that the suppliers with previous relationships 380-1 may influence the continuous category intelligence 380 for sorting the continuous supplier intelligence 345 into maintaining the database for available supplier 310. Further, modeler 130 and the monitor 140 may be so configured that the real time context 305 may be coupled to the database of available supplier 310 for tracking the direct and indirect sourcing requirements 375 and for the proactive sensing of business requirements 340. In an example, the available supplier 310 may be a list of available suppliers maintained as database by modeler 130.

In an example, the modeler 130 of system 110 may be configured for ensuring pricing transparency 315. The modeler 130 may assemble a supplier portfolio 350. The modeler 130 may be configured to obtain a pricing 385 from the assembled supplier portfolio 350. In an example, the modeler 130 may ensure pricing transparency by obtain the pricing 385 from the assembled supplier portfolio 350 and comparing the same.

In an example, the modeler 130 may include a total information awareness system 320. The total information awareness system 320 may include tracking supplier personnel 355, tracking supplier behavior 390 and tracking supplier personnel behavior 390-1. The tracking of supplier personnel 355 may be carried out for example, by using human resource management resources like LinkedIn®, various business directories and the like. The tracking of supplier behavior 390 may be carried out for example by previous collaborations, market intelligence reports on supplier behavior with other similar procurement requests and the like. The tracking of supplier personnel behavior 390-1 may be carried out for example, through market intelligence reports, various business directories, previous collaborations, previous request reviews and the like. In an example, the total information awareness system 320 may be a part of the modeler 130 and may influence the continuous category intelligence 380.

In an example, the modeler 130 may be configured for innovation assessment 325 amongst the available supplier 310. The modeler 130 may be configured to track innovation 360 amongst the available supplier 310. In an example, the modeler 130 may be configured track innovation at supplier side 395 before including the supplier into the list of available supplier 310. Further, the innovation assessment 325 may influence the continuous supplier intelligence 345 and the continuous category intelligence 380.

In an example, the modeler 130 may be configured for operational risk assessment 330 amongst the available supplier 310. The modeler 130 may be configured to collect operation risk facts, figures, history and the like from industry portal. This is depicted as collect operation risk from industry portal 399. The modeler 130 may then use the collected operation risk from industry portal 399 to form operational risk metrics 365. The operational risk metrics 365 may be used for the operational risk assessment 330.

In an example, the modeler 130 and the updater 150 may be configured for tracking customer—supplier collaboration 335 and extending customer supplier relationship 370. The modeler 130 may be further configured to extend customer supplier relationship 370 based on the real time context 305, the direct and indirect sourcing requirements 375, the proactive sensing of business requirements 340, the available supplier 310, the continuous supplier intelligence 345, the continuous category intelligence 380, the total information awareness system 320, the innovation assessment 325, the operational risk assessment 330, and the operational risk metrics 365.

In an example, in accordance with present disclosure the system 110 may use the monitor 140 for evaluation of real time context 305. Further, the system 110 may use the modeler 130 for maintaining and evaluating. the database of available supplier 310. The evaluation of the available supplier 310 may be done using the pricing transparency 315, the total information awareness system 320, the innovation assessment 325, the operational risk assessment 330, and the customer—supplier collaboration 335. Further the modeler 130 and the monitor 140 may be linked to each other through the processor 120. The processor 120 may allow monitor 140 and modeler 130 to share real time context evaluation 305 pertaining to procurement data and available supplier data 310.

Figure 4:
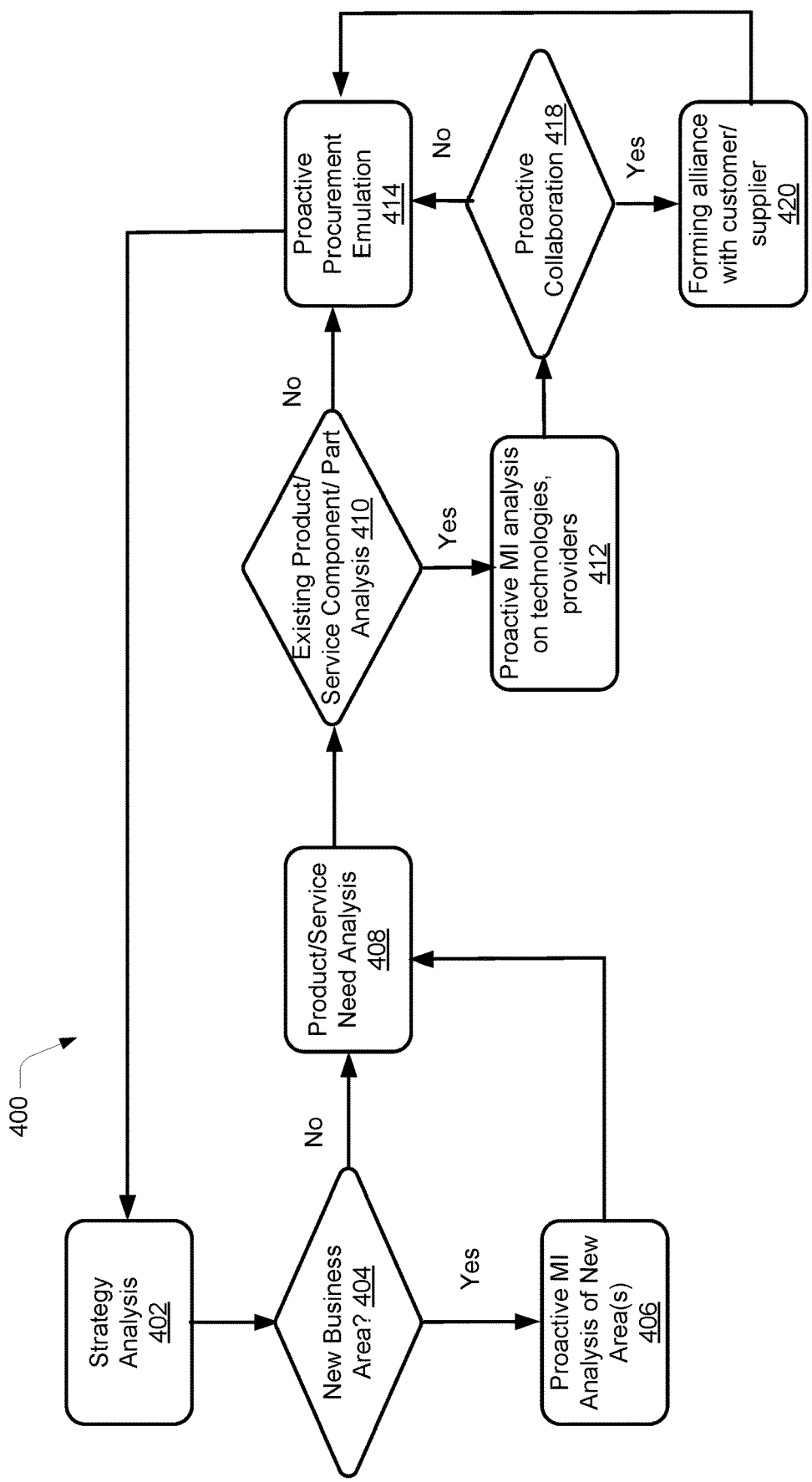
FIG. 4 illustrates a process flowchart for proactive sensing on business requirements according to an example embodiment of the present disclosure.

FIG. 4 illustrates a process flowchart 400 for proactive sensing on business requirements 340 presented as an example of the system 110 for cognitive procurement and proactive continuous sourcing according to an example embodiment of the present disclosure.

The process flow chart 400 provides an example of working of system 110 for analysing direct and indirect sourcing requirements 375 and the proactive sensing on business requirements 340. In an example, the monitor 140 may be involved in analysing direct and indirect sourcing requirements 375 and the proactive sensing on business requirements 340.

The process 400 may begin with a strategy analysis 402. The strategy analysis 402 may be a new merger, a new acquisition, a new merger and acquisition, a new business area, and the like. The strategy analysis 402 may detect a new business area 404. The detection of the new business area 404 leads to proactive market intelligence gathering 406 specific for the new business area 404 by the system 110. The market intelligence gathering 406 may be a part of real time context 305.

In an example, the strategy analysis 402 may not detect a new business area 404. In such a case, the monitor 140 would perform a product/service need analysis 408. Further, the data obtained from the market intelligence gathering 406 would also be used for the product/service need analysis 408. The product/service need analysis 408 may detect need for an existing product/service component/part analysis 410. The existing product/service component/part analysis 410 may include procurement requests, which may be recurrent for a particular user. Upon detection of the recurrent procurement request, the monitor 140 may initiate proactive market intelligence analysis 412 on available suppliers. In an example, the proactive market intelligence analysis 412 may be carried out on database of available suppliers 310. Further, the proactive market intelligence analysis 412 may include using the pricing transparency 315, the total information awareness system 320, the innovation assessment 325, the operational risk assessment 330, and the customer—supplier collaboration 335. In an example, the proactive market intelligence analysis 412 may lead to proactive collaboration 418. The proactive collaboration 418 may include initiation of forming a new customer—supplier collaborations similar to customer—supplier collaboration 335.

In an example, the product/service need analysis 408 may not detect need for an existing product/service component/ part analysis 410. The product/service need analysis 408 may detect need a new product or service component. Upon such a detection, the monitor 140 would carry out a proactive procurement emulation 414. The proactive procurement emulation 414 may include reproduction of the strategy analysis 402. Further, the proactive procurement emulation 414 may include market intelligence analysis to find new products or services, which might be different from the products or services covered by the existing product/service component/part analysis 410. The system 110 is configured so that the process of the proactive procurement emulation 414 till a time when the product/service need analysis 408 will only detect need for an existing product/service component/part analysis 410.

In an example, the proactive collaboration 418 may lead to formation of an alliance 420 between customer and supplier. In an example, the proactive collaboration 418 may not lead to formation of an alliance 420 between customer and supplier. In such cases, the system 110 is configured to carry out the proactive procurement emulation 414. The proactive procurement emulation 414 would be carried out till a time when the proactive collaboration 418 may lead to formation of an alliance 420 between customer and supplier.

The example described above is in accordance with present disclosure a process by which the monitor 140 of the system 110 may carry out the direct and indirect sourcing requirements 375, the proactive sensing of business requirements 340, which may lead to evaluation of real time context 305.

Figure 5:
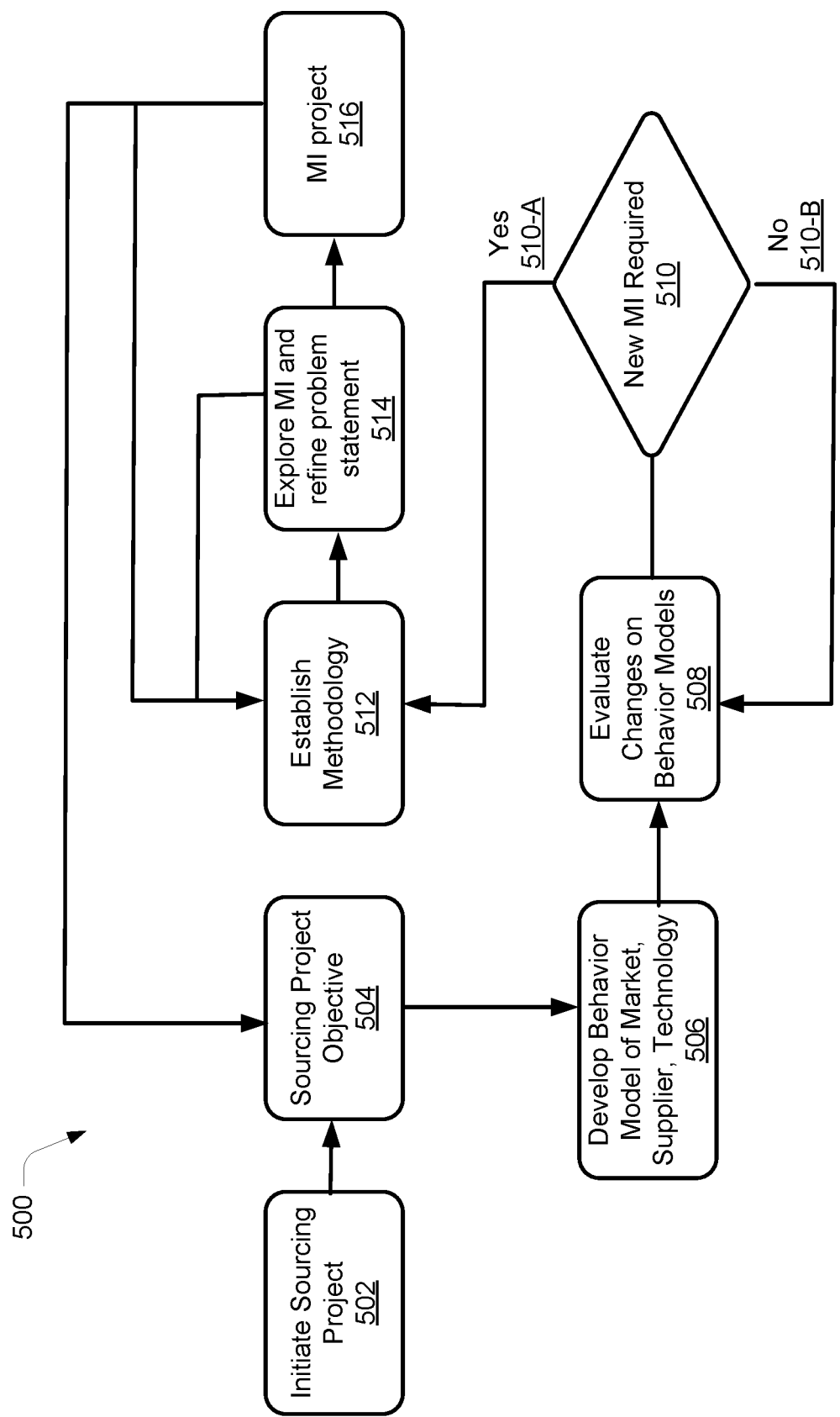
FIG. 5 illustrates a process flowchart for continuous supplier intelligence according to an example embodiment of the present disclosure.

FIG. 5 illustrates a process flowchart 500 for continuous supplier intelligence 345 presented as an example of the system 110 for cognitive procurement and proactive continuous sourcing according to an example embodiment of the present disclosure.

The process flow chart 500 provides an example of working of system 110 for gathering continuous supplier intelligence 345 and sorting the same into continuous category intelligence 380. In an example, the modeler 130 may be involved in gathering continuous supplier intelligence 345 and sorting the same into continuous category intelligence 380.

The process 500 may begin with a user initiating a sourcing project 502. The modeler 130 may receive the sourcing project 502 from the processor 120. In an example, the sourcing request 502 may be the procurement interaction 255. The sourcing project 502 may be deconstructed to form a sourcing project objective 504. The sourcing project objective 504 may include results from the proactive sensing of business requirements 340, the proactive procurement emulation 414, or results from evaluation of real time context 305.

The sourcing project objective 504 may be used to develop a behavior model 506 for markets, suppliers, technology and the like. The behavior model 506 may be developed individually for each market, supplier, technology. The behavior model 506 may be developed as an amalgamation of a particular supplier, technology, market, and the like. The process 500 may further include evaluation of changes 508 on any of the behavior model 506. In an example, the modeler 130 may detect changes in the behavior model 506. The modeler 130 may then initiation a new market intelligence requirement 510. The system 110 may be configured such that it would be determined at block 510 whether there may be a need for a new market intelligence requirement. If it may be determined that there is no requirement for new market intelligence 510, the process 500 may further include evaluation of changes 508 on any of the behavior model 506 as indicated by "no" branch 510-B in FIG. 5. If it may be determined that there is need for new market intelligence requirement, the process 500 would use results of the new market intelligence requirement at block 510 to establish methodology 512 for gather supplier intelligence 345 as depicted by a "yes" branch 510-A in FIG. 5. The methodology 512 is used to explore market intelligence and refine problem statement 514. The problem statement 514 may then cyclically be used to modify established methodology 512 in order to further refine problem statement 514. The process 500 further includes initiating a marker intelligence project 516 based on methodology 512 and problem statement 514. In an example, the marker intelligence project 516 may be linked to the sourcing project objective 504.

The system 110 is configured so that the modeler 130 would keep initiating a new market intelligence requirement similar to the market intelligence requirement 510 till there are no changes detected in evaluation of changes 508 in behavior model 506.

The example described above is in accordance with present disclosure a process by which the modeler 130 of the system 110 may carry out the gathering of the continuous supplier intelligence 345 and sorting the same into continuous category intelligence 380 for forming database of available suppliers 310.

Figure 6:
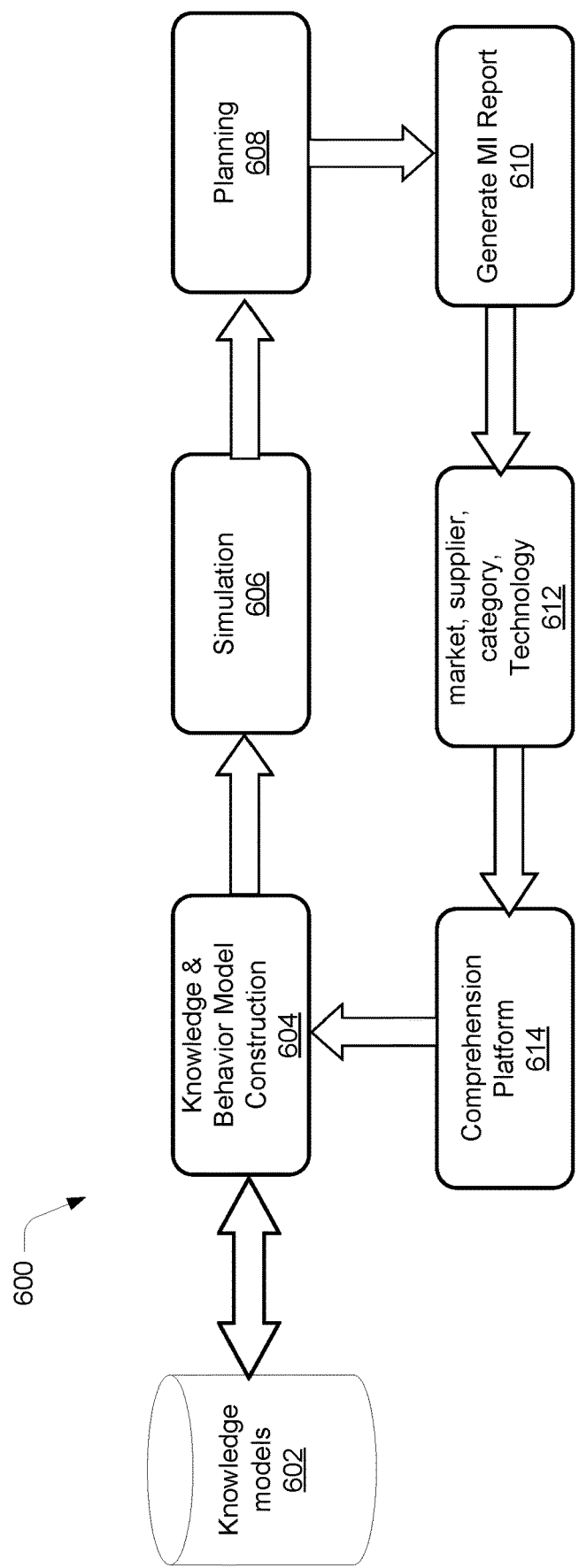
FIG. 6 illustrates a process flowchart for continuous market intelligence system, according to an example embodiment of the present disclosure.

FIG. 6 illustrates a flowchart 600 for evaluation of changes 508 in behavior model 506, presented as an example of the system 110 for cognitive procurement and proactive continuous sourcing according to an example embodiment of the present disclosure.

The process 600 may begin with the modeler 130 of the system 110 configured to store all behavior models like the behavior model 506. These are depicted as knowledge model database 602 as an example for describing process 600. The process 600 may include using the knowledge model database 602 as a scaffold for building more behavior models similar to the behavior model 506. In an example, the process 600 may include the modeler 130 to construct a knowledge and behavior model 604. In an example, the knowledge and behavior model 604 may be constructed in response to the procurement interaction 255. Further, the knowledge and behavior model 604 may be one of the knowledge models stored in the knowledge model database 602. The knowledge and behavior model 604 may be constructed by the modeler 130 using a simulation 606, which may be based on other knowledge and behavior models like knowledge and behavior model 604 that may be stored in the knowledge model database 602. The simulation 606 may be followed by a planning component 608. The planning component 608 may be configured to develop the results from the simulation 606 in order to develop plans for carrying out market intelligence.

In an example, the simulation 606 and the planning component 608 may be a part of the continuous supplier intelligence 345. The modeler 130 may use the planning component 608 of the process 600 to generate market intelligence reports 610. The market intelligence reports 610 may be sorted according to technology suppliers, markets, or similar categories 612. The categories 612 may form the continuous category intelligence 380 as explained by FIG. 3. In an example, the market intelligence reports 610 and the categories 612 may be used by the modeler 130 for continuous category intelligence 380. The categories 612 may be used by modeler 130 to form a comprehension platform 614. The comprehension platform 614 may be perform a function similar to the evaluation of changes 508 on any of the behavior model 506 as explained by way of FIG. 5. In an example, the comprehension platform 614 may be used by the system 110 to define need for further construction of the knowledge and behavior model 604.

In accordance with an example of present disclosure, the system 110 may be configured to repeat the process 600 continuously for all knowledge and behavior models stored in the knowledge model database 602.

Figure 7:
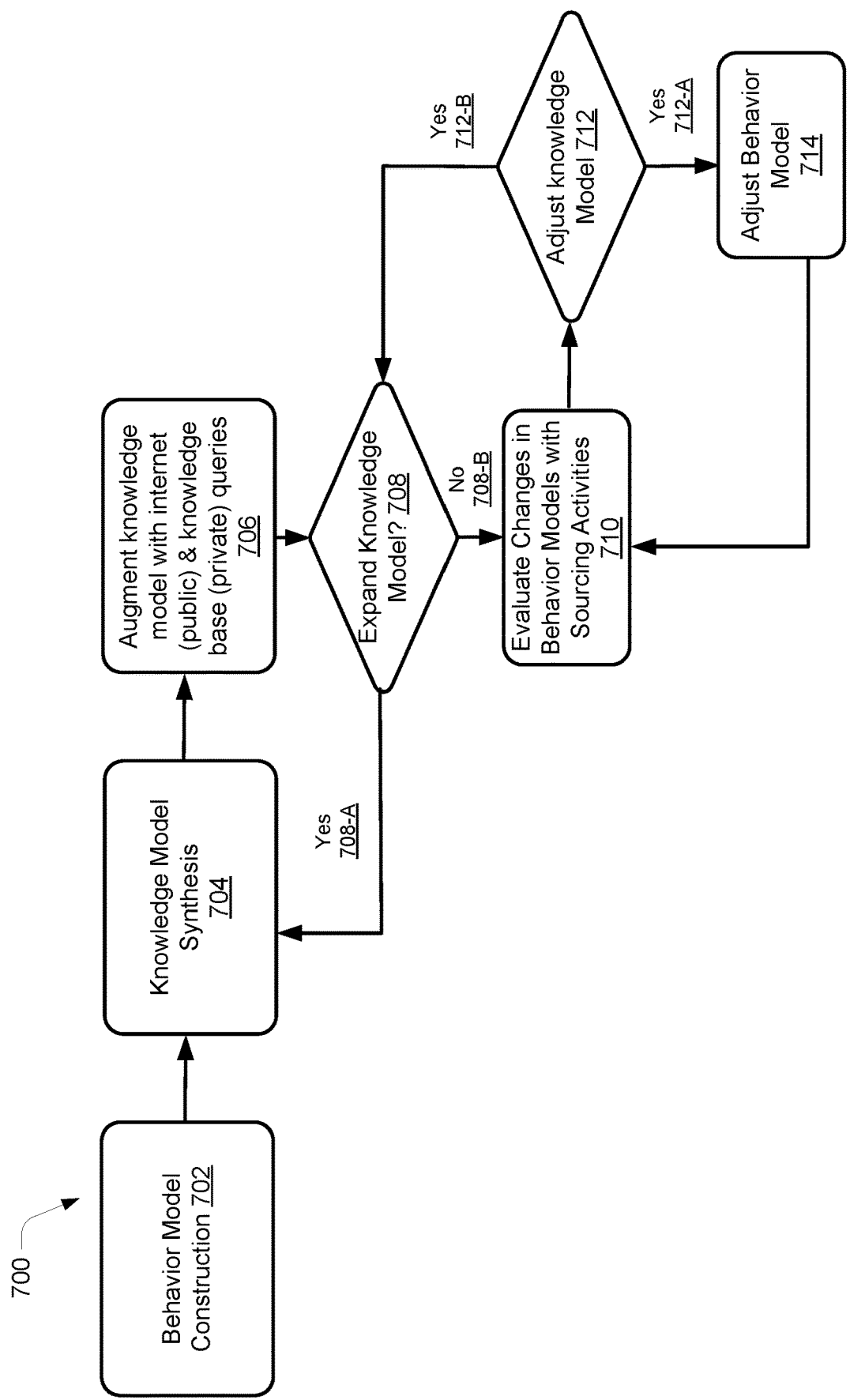
FIG. 7 illustrates a process flowchart for developing behavior model for market, supplier and technology, according to an example embodiment of the present disclosure.

FIG. 7 illustrates a process flowchart 700 for developing behavior model for market, supplier and technology similar to the behavior model 604, presented as an example of the system 110 for cognitive procurement and proactive continuous sourcing according to an example embodiment of the present disclosure.

The process 700 for development of the behavior model for market, supplier and technology may begin with updater 150 of the system 110 constructing a behavior model 702. The behavior model 702 may be constructed from historical data. The historical data may be the behavior model 506, or the knowledge and behavior model 604. The historical data may be stored in the knowledge model database 602. The behavior model 702 may be used for a knowledge model synthesis 704. The synthesised knowledge model 704 may be then augmented by the modeler 130 through supplier intelligence 345 at step 706. The modeler 130 may further augment the synthesised knowledge model 704 through various sources including user queries, business directories, various external databases, internal behavior histories, user procurement behavior model 275 and the like. The updater 150 may then perform an operation similar to the cognitive learning operation 280 for deciding if there is a requirement of an expansion 708 on the synthesised knowledge model 704.

In an example, the updater 150 may detect a need for expansion 708 on the synthesised knowledge model 704 as depicted by a "yes" branch 708-A in FIG. 7. In such a situation, the updater 150 is configured so that it would synthesis a new knowledge model similar to the synthesised knowledge model 704. In an example, the updater 150 may not detect a need for expansion 708 on the synthesised knowledge model 704 as depicted by a "no" branch 708-B in FIG. 7. In such a situation, the updater may be configured to perform an evaluation 710. The evaluation 710 may include an evaluation similar to evaluation of changes 508 on any of the behavior model 506. In an example, the updater 150 may evaluate changes in the procurement request 255 with respect to the changes the synthesised knowledge model 704. The updater 150 may be configured to use the cognitive learning operation 280 for deciding if there is a need to for an adjustment 712. The adjustment 712 may include adjusting the synthesised knowledge model 704.

In an example, the cognitive learning operation 280 of the updater 150 may detect need for adjustment 712. In such a situation, the updater 150 would perform adjustment 712 on the synthesised knowledge model 704. The updater 150 would also perform an adjustment 714 in the behavior model 702. In an example, the cognitive learning operation 280 of the updater 150 may not detect need for adjustment 712. In such a situation, the updater 150 would perform another operation similar to cognitive learning operation 280 for deciding if there is need for the expansion 708 on the synthesised knowledge model 704.

The system 110 may be configured such that the expansion 708, the evaluation 710, the adjustment 712 and the adjustment 714 may be repeated for all knowledge and behavior models stored in the knowledge model database 602. The system 110 may be configured so that results of the expansion 708, the evaluation 710, the adjustment 712 and the adjustment 714 may be updated into the knowledge model database 602.

Figure 8:
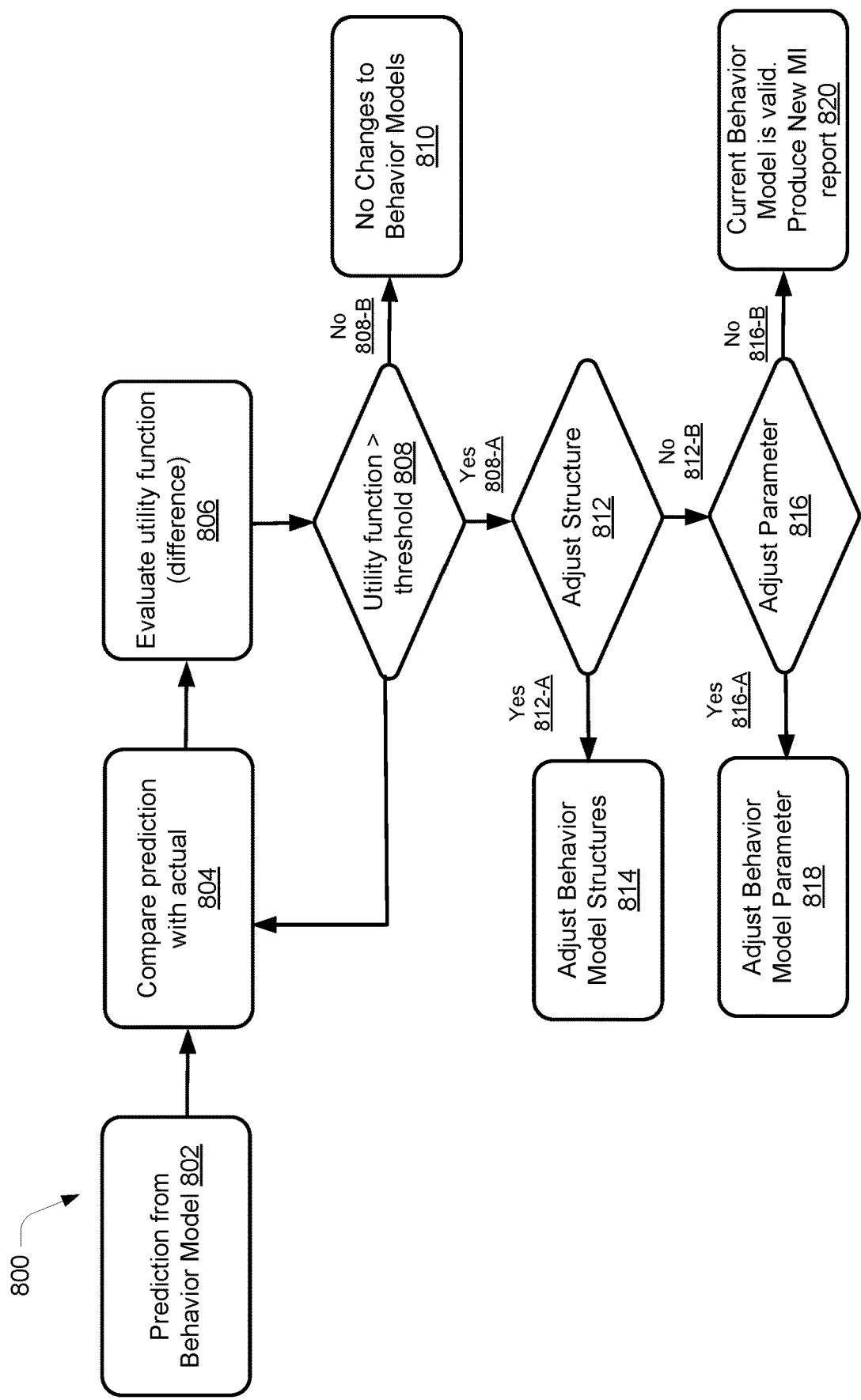
FIG. 8 illustrates a process flowchart for evaluating changes in behavior models, according to an example embodiment of the present disclosure.

FIG. 8 illustrates a process flowchart 800 for evaluating changes in behavior models similar to the behavior model 702, presented as an example of the system 110 for cognitive procurement and proactive continuous sourcing according to an example embodiment of the present disclosure.

The process 800 may begin with the updater 150 using the cognitive learning operation 280 for make a prediction 802 from a behavior model in response to the procurement request 255. The behavior model received by prediction 802 may be the behavior model 506, or the knowledge and behavior model 604, or the behavior model 702, or the synthesised knowledge model 704. The updater may also develop an actual behavior model similar to the behavior model 506, or the knowledge and behavior model 604, or the behavior model 702, or the synthesised knowledge model 704 specific for the procurement request 255. The behavior model constructed by the prediction 802 may further include a behavior model structure 814 and a behavior model parameter 818.

The updater 150 may be configured to then perform a comparison 804 between the prediction 802 and the actual behavior model listed above. Further, the updater may perform an evaluation 806 in order to develop difference between the prediction 802 and the actual behavior model listed above. In an example, the evaluation 806 may be based on the results obtained from comparison 804.

The system 110 may be configured so that the updater 150 may use the cognitive learning operation 280 for marking a difference threshold 808. In an example, the results from the evaluation 806 may be below the difference threshold 808 as depicted by a "no" branch 808-B in FIG. 8. In such a situation, the updater 150 may use the cognitive learning operation 280 to ensure that no further changes take place in the behavior model constructed by the prediction 802. This is illustrated as step 810 in FIG. 8.

In another example, the results from the evaluation 806 may be above the difference threshold 808 as depicted by a "yes" branch 808-A in FIG. 8. In such a situation, the updater 150 may use the cognitive learning operation 280 for deciding whether there is need for a first adjustment 812 in the behavior model constructed by the prediction 802. The first adjustment 812 may be related to adjustment in the behavior model structure 814 as depicted by a "yes" branch 812-A in FIG. 8. In an example, the adjustment 812 may lead to a change in the behavior model structure 814 of the behavior model constructed by the prediction 802. Further, the adjustment 812 may include adjusting the synthesised knowledge model 704. In an example, the adjustment 812 may not lead to the change in the behavior model structure as depicted by a "no" branch 812-B in FIG. 8. In such a situation, the cognitive learning operation 280 may further decide if there is need for a second adjustment 816. The second adjustment 816 may be related to adjustment in the behavior model parameter 818. In an example, the second adjustment 816 may lead to a change in the behavior model parameter 818 as depicted by a "yes" branch 816-A in FIG. 8.

The system 110 may be so configured that the evaluation 806, the first adjustment 812, and the second adjustment 816 are performed repeatedly till a time when the cognitive learning operation 280 decides that the model generated by prediction 802 is valid as depicted by a "no" branch 816-B in FIG. 8. This may lead to generation of a market intelligence report 820. In an example, the market intelligence report 820 may become a part of the continuous supplier intelligence 345.

Figure 9:
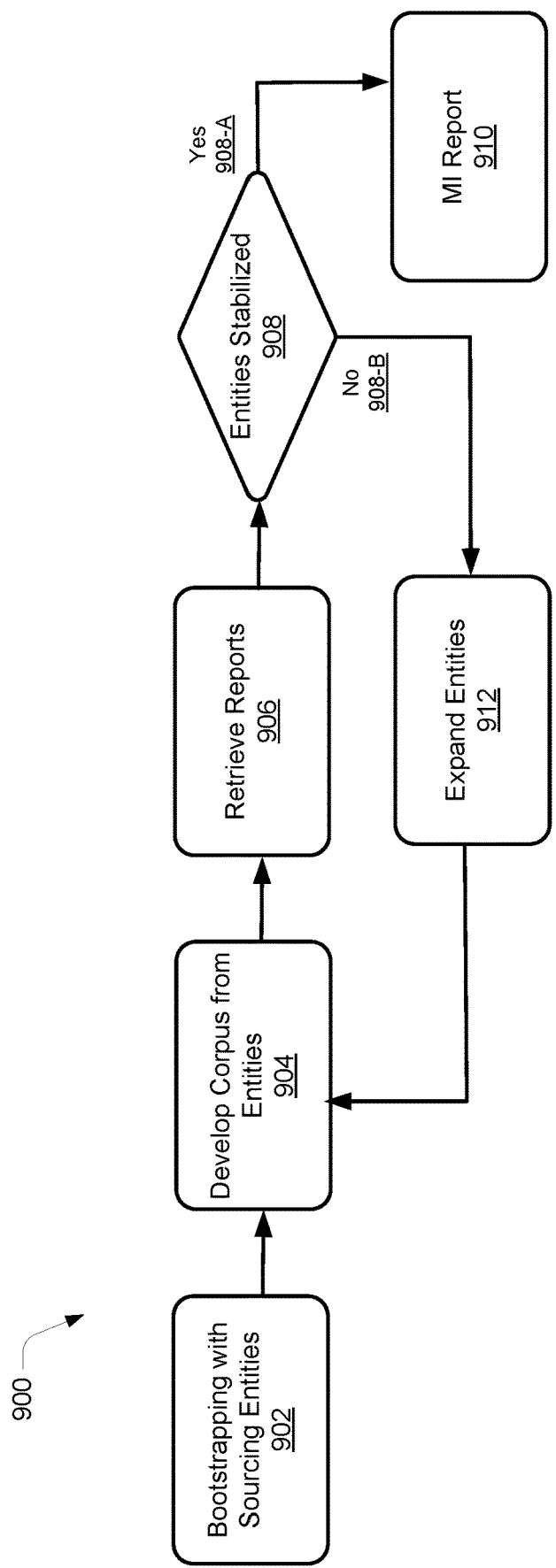
FIG. 9 illustrates a process flowchart for iterative refinement for mi report generation based on seeded entities, according to an example embodiment of the present disclosure.

FIG. 9 illustrates a process flowchart 900 for iterative refinement for market intelligence report 820, presented as an example of the system 110 for cognitive procurement and proactive continuous sourcing according to an example embodiment of the present disclosure.

The process 900 may begin after the system 110 has generated the market intelligence report 820. In an example, the market intelligence report 820 may be used as a scaffold for a bootstrapping operation 902 with sourcing entities. The modeler 130 may be configured to receive the market intelligence report 820 from the updater 150 through the processor 120. The modeler 130 may then perform the bootstrapping 902 on the market intelligence report 820 against plurality of data domains 250. The modeler 130 may be configured to use the artificial intelligence platform 220 to develop a corpus 904 from the plurality of data domains 250 and bootstrapping 902. The corpus 904 may include a collection of written texts about a particular domain from the plurality of data domains 250. The modeler 130 may then use the artificial intelligence 224 to retrieve reports 906 from the corpus 904. The updater 150 of the system 110 may be configured to receive the reports 906. The updater 150 may be configured to use the cognitive learning operation 280 for deciding if reports have achieved a stabilization 908.

In an example, the cognitive learning operation 280 may find that the stabilization 906 has been achieved illustrated by. a "yes" branch 908-A in FIG. 9. In such situation, the updater 150 would generate a market intelligence report 910. In an example, the cognitive learning operation 280 may find that the stabilization 906 has not been achieved illustrated by a "no" branch 908-B in FIG. 9. In such situation, the updater 150 would perform an expansion 812 on the plurality of data domain 250. The system 110 may be configured so that the expansion 812 may be followed by the generation of corpus 904 and the retrieval of reports 906. The expansion 812, the generation of corpus 904 and the retrieval of reports 906 may continue till such a time when the cognitive learning operation 280 may decide that the stabilization 908 has been achieved. In an example, the expansion 812, the generation of corpus 904 and the retrieval of reports 906 may form part of the continuous supplier intelligence 345.

The process 900 is an example, in accordance with the present disclosure, which may be used for continuous supplier intelligence 345 and expansion of available supplier data 310. In an example, the process 900 may be used for report generation based on the plurality of data domains 250. The plurality of data domains 250 may also be referred to as seeded entities in some parts of this description. In an example, the process 900 illustrates iterative refinement for market intelligence report generation based on the plurality of data domains 250.

Figure 10:
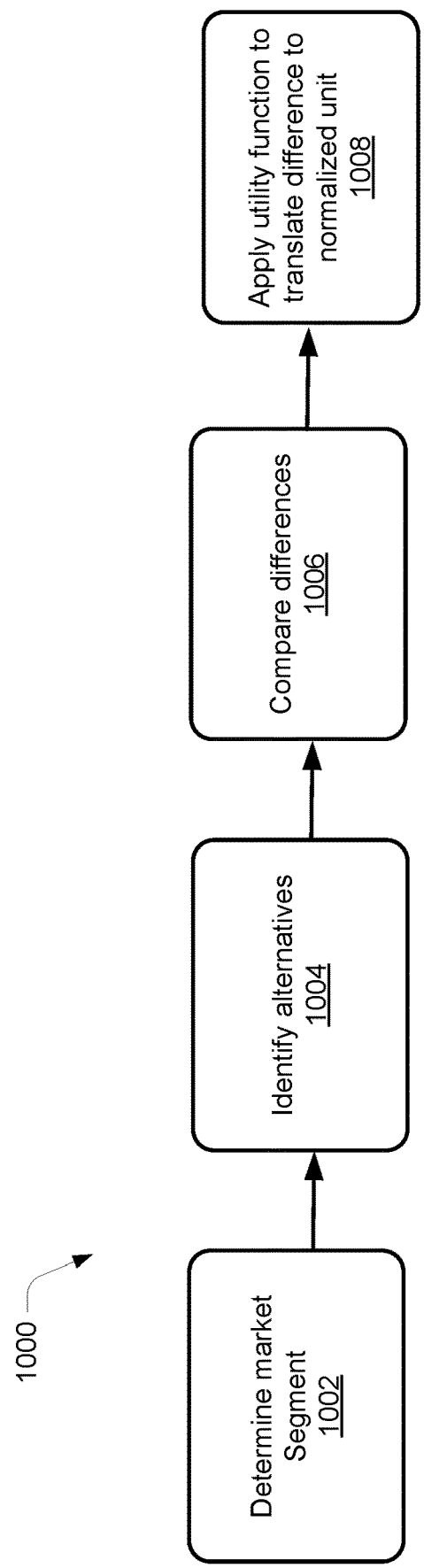
FIG. 10 illustrates a process flowchart for price transparency: normalize alternative(s) to the same pricing, according to an example embodiment of the present disclosure.

FIG. 10 illustrates a process flowchart 1000 for price transparency 315, presented as an example of the system 110 for cognitive procurement and proactive continuous sourcing according to an example embodiment of the present disclosure.

The process 1000 begins when with generation of the market intelligence report 910 or the market intelligence report 820, or the market intelligence report 610. The modeler 130 of the system 110 determines a market segment 1002 for any of the market intelligence report 910 or the market intelligence report 820, or the market intelligence report 610. The modeler 130 may assemble the supplier portfolio 350 for the procurement request 255. The modeler 130 may be configured to obtain the pricing 385 from the assembled supplier portfolio 350 for the procurement request 255.

The updater 150 may receive the assembled supplier portfolio 350 for the procurement request 255. The updater 150 may be configured to obtain the pricing 385 from the assembled supplier portfolio 350 for the procurement request 255. The updater 150 may perform the cognitive learning operation 280 for identifying various alternative suppliers 1004 amongst the assembled supplier portfolio 350. The cognitive learning operation 280 may perform a comparison 1006 between the pricing 385 received from the assembled supplier portfolio 350 for the procurement request 255. The cognitive learning operation 280 may be configured to perform a translation 1008 on the difference between pricing and present normalize alternative(s) to the same pricing, according to an example embodiment of the present disclosure.

Figure 11:
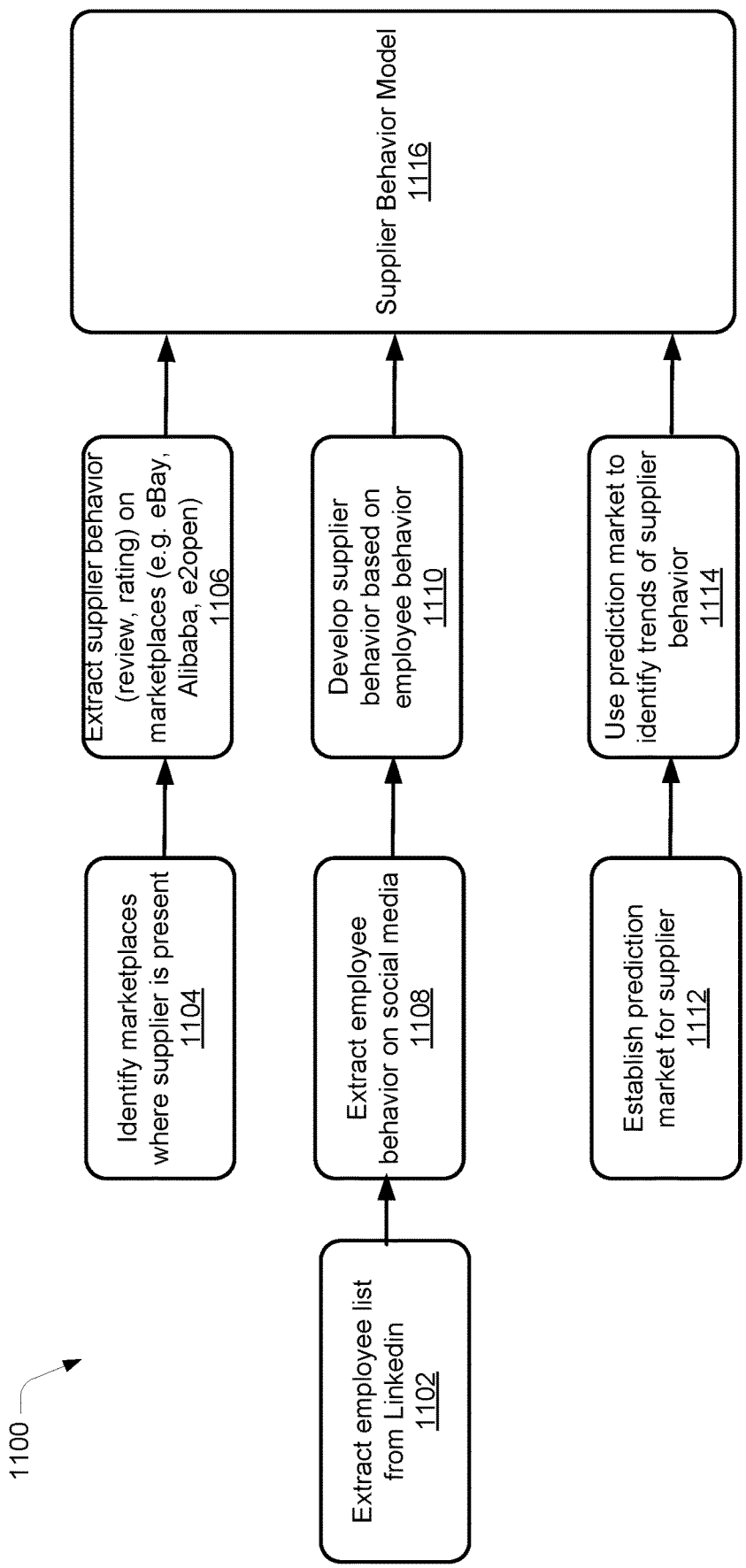
FIG. 11 illustrates a process flowchart for total information awareness, according to an example embodiment of the present disclosure.

FIG. 11 illustrates a process flowchart 1100 for total information awareness 320, presented as an example of the system 110 for cognitive procurement and proactive continuous sourcing according to an example embodiment of the present disclosure.

In example, the system 110 is so configured the modeler 130, and the updater 150 may be configured to perform the process 1100 depicted by FIG. 11.

The modeler 130 may include the total information awareness system 320. The total information awareness system 320 may include tracking supplier personnel 355. In an example, as illustrated by process 1100, the modeler 130 may perform an extraction 1102. The extraction 1102 may be related to extracting an employee of a supplier from for example, LinkedIn®. The extraction 1102 may include tracking supplier personnel 355.

The modeler 130 may use the extraction 1102 for an identification 1104. In an example the identification 1104 may include identifying marketplaces where a supplier is present. The modeler 130 may further use the identification 1104 for a supplier behavior extraction 1106. The supplier behavior extraction 1106 may include tracking supplier behavior 390. The supplier behavior extraction 1106 may include supplier behavior, supplier reviews, supplier ratings and the like on various marketplaces. In an example, the marketplaces may include websites like eBay, Alibaba, e2open and the like. The supplier behavior extraction 1106 may be carried out for example by previous collaborations, market intelligence reports on supplier behavior with other similar procurement requests and the like.

The modeler 130 may use the extraction 1102 for an extraction 1108. The extraction 1108 may include extracting employee behavior on social media. The modeler 130 may further use the extraction 1108 for supplier behavior development 1110. The supplier behavior development 1110 may include assessing employee behavior over various social media platforms. The supplier behavior development 1110 may include tracking supplier personnel behavior 390-1. The supplier behavior development 1110 through market intelligence reports, various business directories, previous collaborations, previous request reviews and the like.

The modeler 130 may use the extraction 1102 for an establishment 1112. The establishment 1112 may include establishing prediction market for the supplier. The modeler 130 may further use the establishment 1112 for supplier behavior trend identification 1114. In an example, the modeler 130 may use prediction marker supplier behavior trend identification 1114.

The system 110 may be configured so that the supplier behavior extraction 1106, the supplier behavior development 1110, and the supplier behavior trend identification 1114 may be used to develop a supplier behavior model 1116. In an example, the modeler 130 may use the artificial intelligence component 220 for the extraction 1102, the identification 1104, the supplier behavior extraction 1106, the extraction 1108, the supplier behavior development 1110, the establishment 1112, or the supplier behavior trend identification 1114. In an example, the process 1100 may influence the continuous category intelligence 380.

Figure 12:
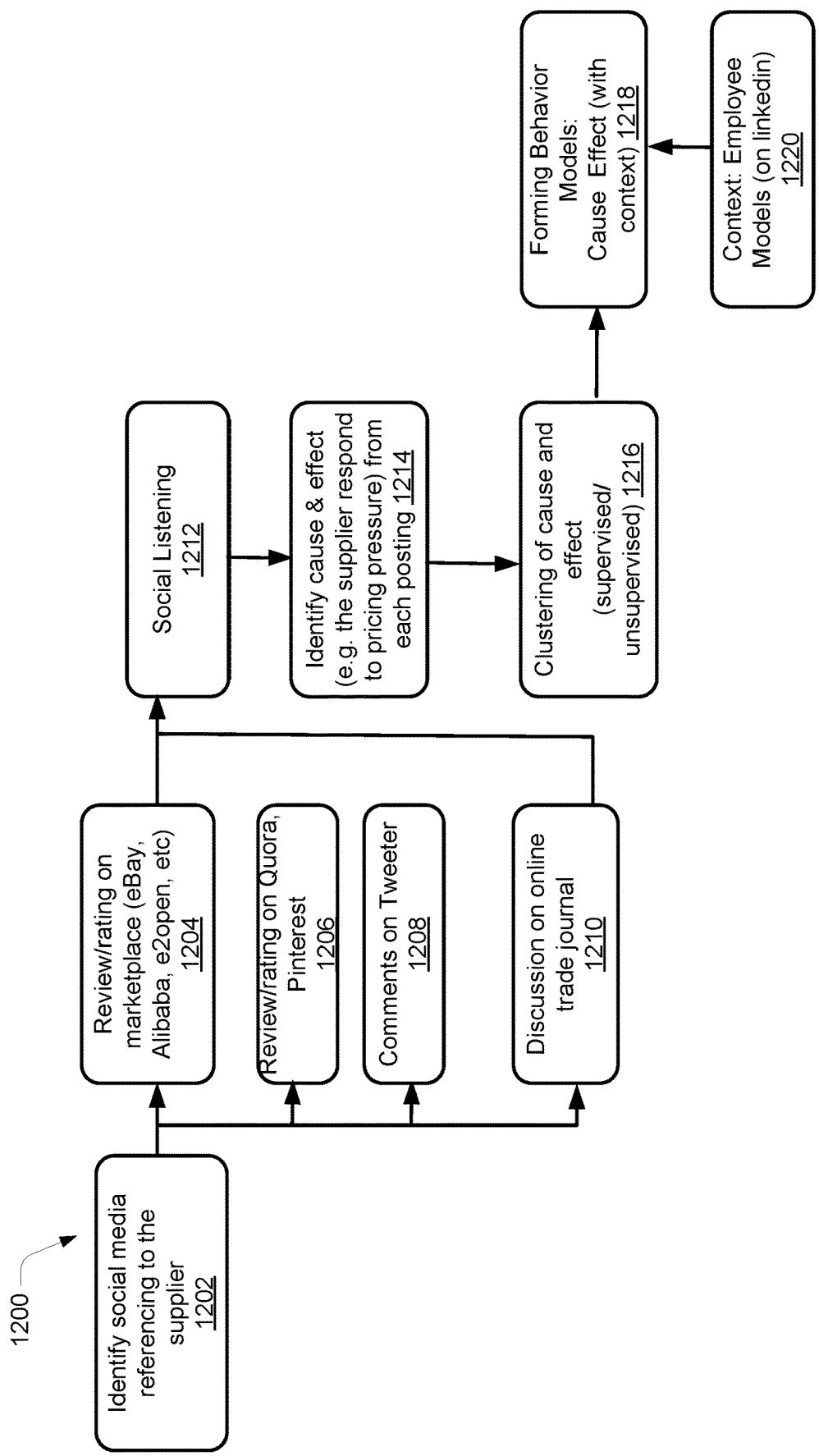
FIG. 12 illustrates a process flowchart for constructing supplier behavior model, according to an example embodiment of the present disclosure.

FIG. 12 illustrates a process flowchart 1200 for constructing supplier behavior model 1116, presented as an example of the system 110 for cognitive procurement and proactive continuous sourcing according to an example embodiment of the present disclosure.

In example, the system 110 is so configured the modeler 130, and the updater 150 may be configured to perform the process 1200 depicted by FIG. 12.

The modeler 130 may be configured use the artificial intelligence component 220 for an identification 1202. The identification 1202 may include identifying social media referencing to a supplier from the available supplier data 310. The identification 1202 may include for example, a marketplace rating 1204, a social media rating 1206, social media comments review 1208, or an online trade journal discussion 1210. In an example, the marketplace rating 1204 may include reviews or ratings from eBay®, Alibaba®, e2open®, and the like. The social media rating 1206 may include for example, reviews or ratings from Quora®, Pinterest® and the like. The social media comments review 1208 may include comments assessment on websites like Twitter®, Instagram®, Facebook®, LinkedIn®, and the like.

In an example, the marketplace rating 1204, the social media rating 1206, the social media comments review 1208, and the online trade journal discussion 1210 conglomerate into social listening 1212 for a particular supplier. The updater 150 of the system 110 may be configured to the receive the data under social listening 1212 from the modeler 130 through the processor 120. The updater 150 may use perform a cognitive operation for an identification 1214. The identification 1214 may include identifying cause & effect from each posting under the social listening 1212. In an example, the cause & effect may include the supplier response to pricing pressure for procurement interactions like the procurement interaction 255. The updater may then develop a cluster 1216. The cluster 1216 may include clustering of cause and effect from each posting under the social listening 1212 and identified by the identification 1214. In an example, the cluster 1216 may be supervised by a user. In another example, the cluster 1216 may be automated and unsupervised by the user. The updater 150 may generate context effect behavior models 1218 using the cluster 1216. The updater 150 may generate context effect employee models 1220 using cluster 1216. In an example, the supplier behavior model 1116 may include the context effect behavior models 1218. Further, the supplier behavior model 1116 may include the context effect employee models 1220.

Figure 13:
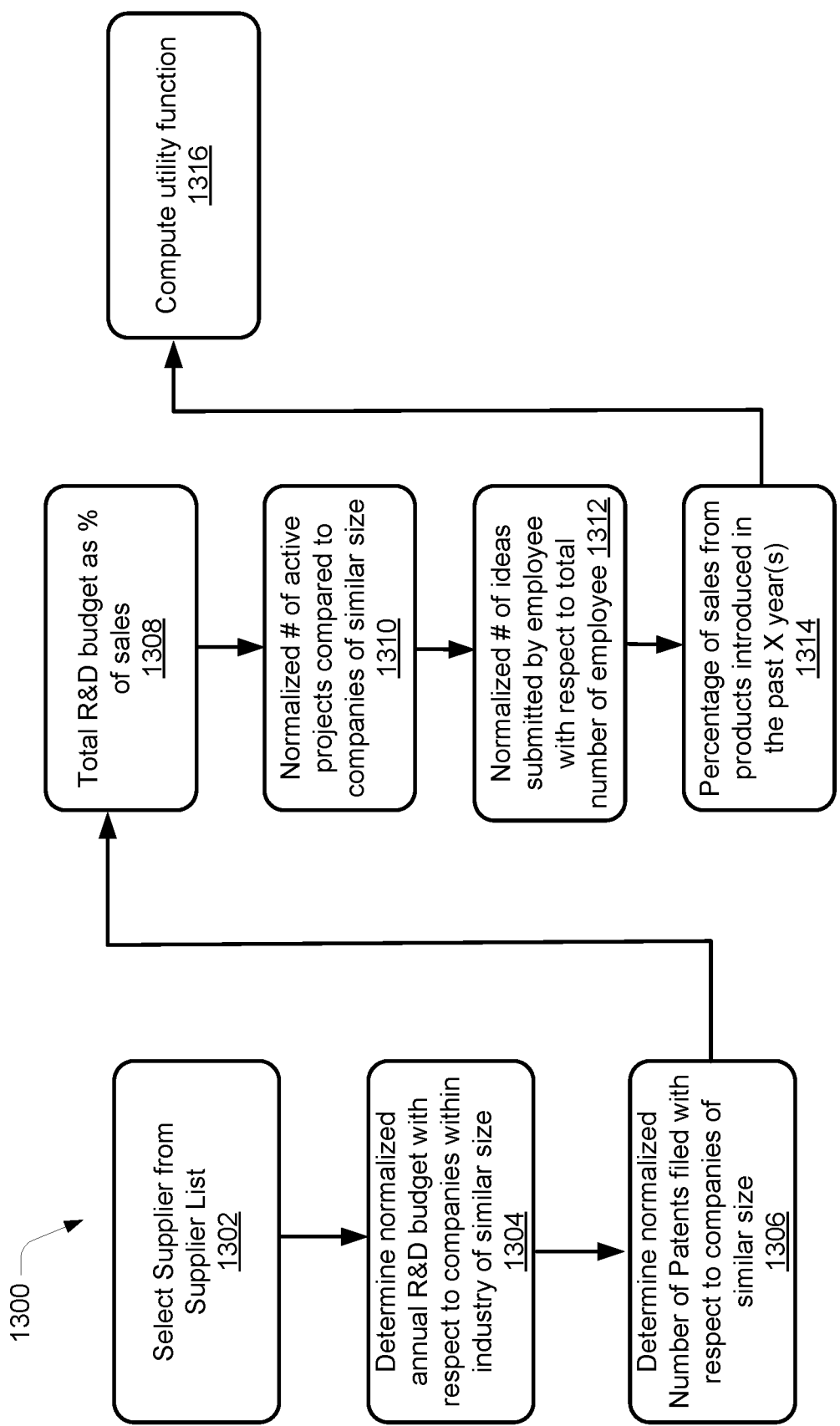
FIG. 13 illustrates a process flowchart for supplier innovation, according to an example embodiment of the present disclosure.

FIG. 13 illustrates a process flowchart 1300 for supplier innovation assessment 325, presented as an example of the system 110 for cognitive procurement and proactive continuous sourcing according to an example embodiment of the present disclosure.

In an example, the modeler 130 may be configured for innovation assessment 325 amongst the available supplier 310. The modeler 130 may be configured to track innovation 360 amongst the available supplier 310. The modeler 130 may be select a supplier 1302 from the available supplier 310 relevant for the procurement request 255. The modeler 310 may use the artificial intelligence component 220 for supplier research & development (R&D) budget determination 1304. The determination 1304 may include determining normalized annual R&D budget with respect to companies within industry of similar size relevant to the supplier 1302 and the procurement request 255. The modeler 130 may be configured to perfume a patent filing determination 1306.

The patent filing determination 1306 may include determining normalized number of patents filed with respect to companies of similar size relevant to the supplier 1302 and the procurement request 255. The modeler may determine a budget 1308 for each supplier. The budget 1308 may include total R&D budget as a percentage of sales relevant to the supplier 1302 and the procurement request 255. The modeler 130 may determine an active project number 1310. The active project number 1310 may be normalized number of active projects compared to companies of similar size relevant to the supplier 1302 and the procurement request 255. The modeler 130 may determine an employee idea number 1312. The employee idea number 1312 may be a normalized number of ideas submitted by employees with respect to total number of employee relevant to the supplier 1302 and the procurement request 255. The modeler 130 may determine a new product sales number 1314 relevant to the supplier 1302 and the procurement request 255. The new product sales number 1314 may be percentage of sales from products introduced in for example, the past 5 year(s). The modeler 130 may be configured to change number of years for the new product sales number 1314.

The modeler 130 may be configured to use the supplier 1302, the determination 1304, the determination 1306, the budget 1308, the active project number 1310, the employee idea number 1312, the new product sales number 1314 for developing a utility function 1316. The utility function 1316 may be an indicator for the innovation assessment 325. In an example, process 1300 may be used for to track innovation 360. In an example, the modeler 130 may be configured track innovation at supplier side 395 before including the supplier into the list of available suppliers 310. Further, the innovation assessment 325 may influence the continuous supplier intelligence 345 and the continuous category intelligence 380.

Figure 14:
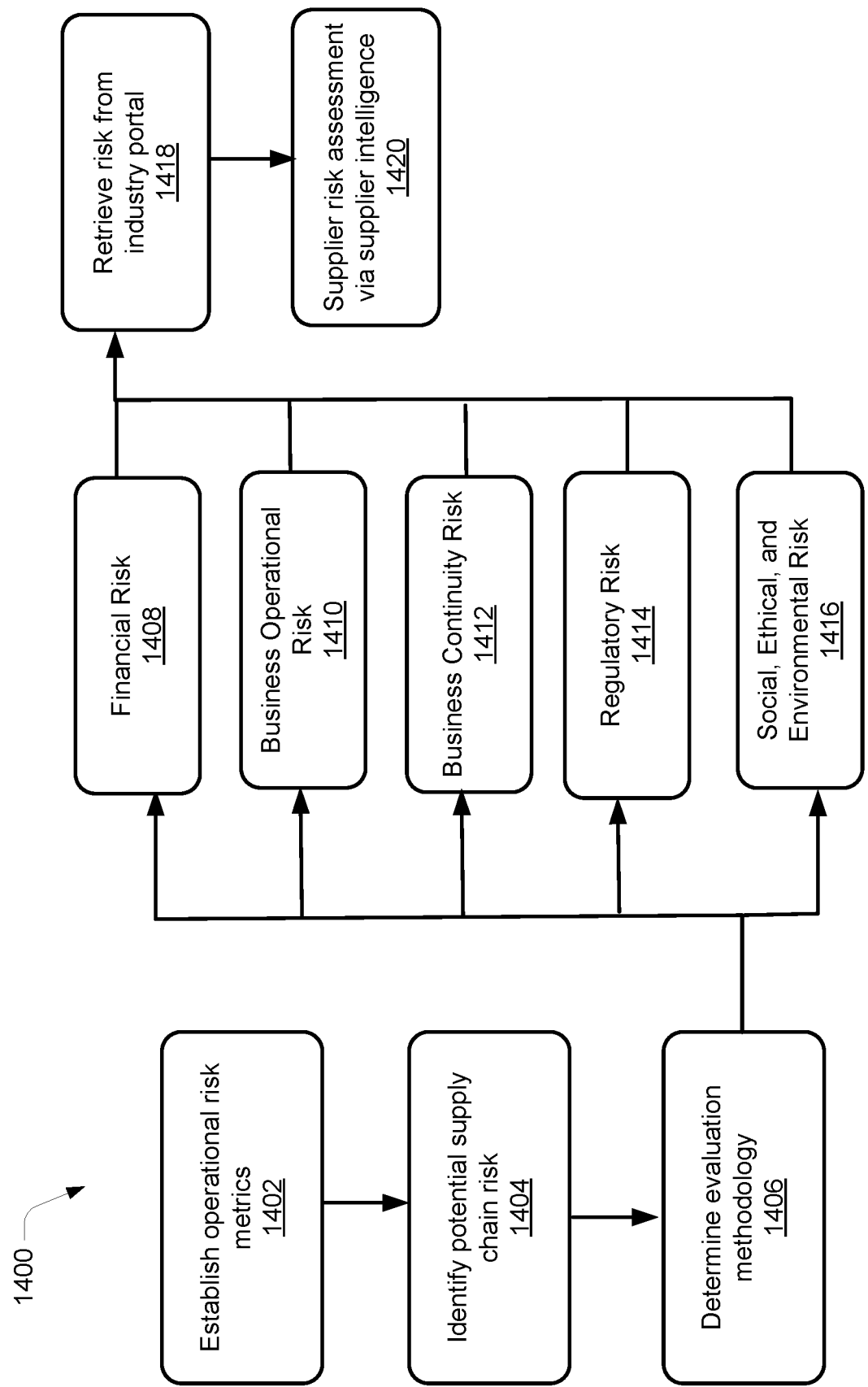
FIG. 14 illustrates a process flowchart for operational risk assessment for supply chain, according to an example embodiment of the present disclosure.

FIG. 14 illustrates a process flowchart 1400, for operational risk assessment 330 amongst the available supplier 310, presented as an example of the system 110 for cognitive procurement and proactive continuous sourcing according to an example embodiment of the present disclosure.

In an example, the modeler 130 may be configured for operational risk assessment 330 amongst the available supplier 310. The modeler 130 may be configured to collect operation risk facts, figures, history and the like from industry portal. This is depicted as collect operation risk from industry portal 399 in FIG. 3. The modeler 130 may then use the collected operation risk from industry portal 399 to form an operational risk metrics 1402. In an example, the operational risk metrics 1402 may include the operational risk metrics 365. The operational risk metrics 1402 may be used for the operational risk assessment 330.

In an example, the operational risk metrics 1402 may be used for risk identification 1404. The risk identification 1404 may include supply chain risk identification. The operational risk metrics 1402 may use a methodology 1406 for the risk identification 1404. The methodology 1406 may include applying the operational risk metrics 1402 for risk identification 1404 of, for example a financial risk 1408, a business operational risk 1410, a business continuity risk 1412, regulatory risk 1414, and a social risk 1216. The financial risk 1408 may include a risk of supplier running low on funds and may not be able to meet requirements of the procurement interaction 255. The business operational risk 1410 may include a risk of supplier not having suitable infrastructure of operational facilities in order to meet requirements of the procurement interaction 255. The business continuity risk 1412 may include a risk of a supplier closing down the business before meeting the requirements of the procurement interaction 255. The regulatory risk 1414 may include a risk of a supplier not following legal statutes, or adhering to legal compliances in order to meet requirements of the procurement interaction 255 legally. The social risk 1216 may include ethical risk, environmental risk and the like. The social risk 1216 may include a risk of a supplier using unethical practices for example, child labour in order to meet requirements of the procurement interaction 255. The social risk 1216 may include a supplier posing undue hazards for the environment in order to meet requirements of the procurement interaction 255.

The modeler 130 may be configured to conglomerate the financial risk 1408, the business operational risk 1410, the business continuity risk 1412, the regulatory risk 1414, the social risk 1216 to form a risk report 1218. The risk report 1218 may be retrieved the modeler 130. The risk report 1218 may be used for a supplier risk assessment 1420. In an example, the operational risk assessment 330 may include the supplier risk assessment 1420.

The process 1400 is an example for performing operational risk assessment 330 in accordance with the present disclosure.

Figure 15:
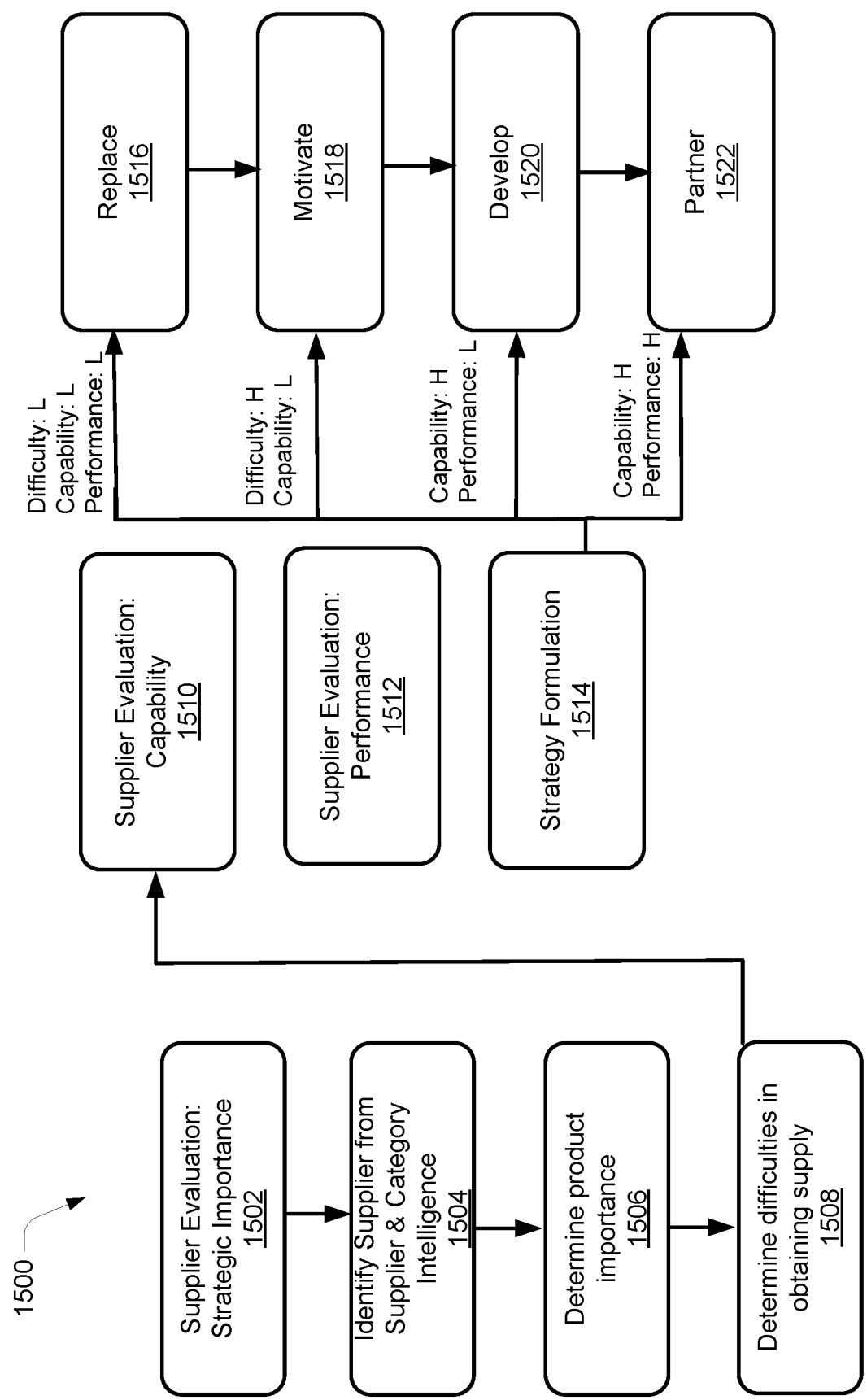
FIG. 15 illustrates a process flowchart for supplier collaboration strategy formulation flowchart, according to an example embodiment of the present disclosure.

FIG. 15 illustrates a process flowchart 1500 for developing supplier collaboration strategy 335 amongst available supplier 310, presented as an example of the system 110 for cognitive procurement and proactive continuous sourcing according to an example embodiment of the present disclosure.

In an example, the modeler 130 and the updater 150 may be configured for tracking customer—supplier collaboration 335 and extending customer supplier relationship 370. The modeler 130 may perform a supplier strategic evaluation 1502. The supplier strategic evaluation 1502 may include a supplier identification 1504 from the available supplier 310. The supplier strategic evaluation 1502 may include a product or service determination 1506. The product or service determination 1506 may include determining importance of a particular product or service relevant for the procurement interaction 255. The supplier strategic evaluation 1502 may include a supply difficulty 1508. The supply difficulty 1508 may include evaluating a product or service based on difficulty level in obtaining the supply of the same from available supplier 310.

The updater 150 may be configured to perform a supplier capability evaluation 1510. The supplier capability evaluation 1510 may include a supplier performance evaluation 1512. The supplier performance evaluation 1512 may include evaluating a supplier from the available supplier 310 for previous contract fulfillments, or fulfillments of similar contracts and the like.

The cognitive learning operation 280 of the updater may amalgamate results from the supplier strategic evaluation 1502 and the supplier capability evaluation 1510 to for a strategy formulation 1514. In an example, when a product or service has low supply difficulty 1508 and a supplier has low supplier capability evaluation 1510, and low supplier performance evaluation 1512, then the system 110 may present replacement 1516 as an option for that supplier. In an example, when a product or service has high supply difficulty 1508 and a supplier has low supplier capability evaluation 1510, then he system 110 may present motivation 1518 as option for the supplier. In an example, when a supplier has high supplier capability evaluation 1510, and low supplier performance evaluation 1512, then the system 110 may present development 1518 as an option for that supplier. In an example, when a supplier has high supplier capability evaluation 1510, and high supplier performance evaluation 1512, then the system 110 may present partner-ship 1518 as an option for that supplier.

The modeler 130 may be further configured to extend customer supplier relationship 370 based on the real time context 305, the direct and indirect sourcing requirements 375, the proactive sensing of business requirements 340, the available supplier 310, the continuous supplier intelligence 345, the continuous category intelligence 380, the total information awareness system 320, the innovation assessment 325, the operational risk assessment 330, and the operational risk metrics 365.

Figure 16:
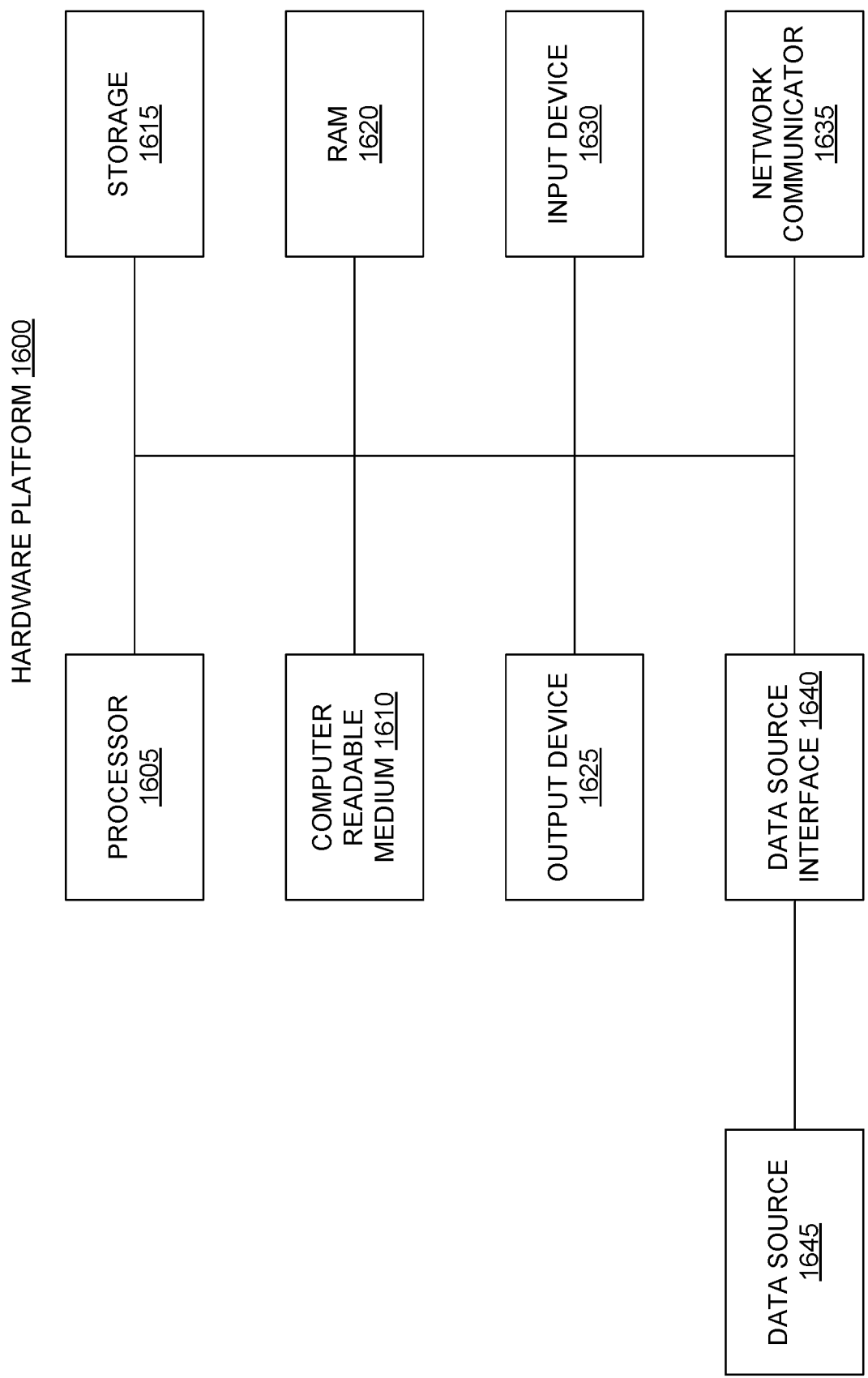
FIG. 16 illustrates a hardware platform for implementation of the system, according to an example embodiment of the present disclosure.

FIG. 16 illustrates a hardware platform for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1600. The hardware platform 1600 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over the FIG. 16, the hardware platform 1600 may be a computer system 1600 that may be used with the examples described herein. The computer system 1600 may represent a computational platform that includes components that may be in a server or another computer system. The computer system 1600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).The computer system 1600 may include a processor 1605 that executes software instructions or code stored on a non-transitory computer readable storage medium 1610 to perform methods of the present disclosure. The software code includes, for example, instructions to gather data and documents and analyze documents. In an example, the modeler 130, the monitor 140 and the updater 150 are software codes or components performing these steps.

The instructions on the computer readable storage medium 1610 are read and stored the instructions in storage 1615 or in random access memory (RAM) 1620. The storage 1615 provides a large space for keeping static data where at least some instructions could be stored for later execution. The stored instructions may be further compiled to generate other representations of the instructions and dynamically stored in the RAM 1620. The processor 1605 reads instructions from the RAM 1620 and performs actions as instructed.

The computer system 1600 further includes an output device 1625 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1600 further includes input device 1630 to provide a user or another device with mechanisms for entering data and/or otherwise interact with the computer system 1600. The input device may include, for example, a keyboard, a keypad, a mouse, or a touchscreen. In an example, output of the updater 150 is displayed on the output device 1625. Each of these output devices 1625 and input devices 1630 could be joined by one or more additional peripherals. In an example, the output device 1625 may be used to display the results of the cognitive learning operation 280.

A network communicator 1635 may be provided to connect the computer system 1600 to a network and in turn to other devices connected to the network including other clients, servers, data stores, and interfaces, for instance. A network communicator 1635 may include, for example, a network adapter such as a LAN adapter or a wireless adapter. The computer system 1600 includes a data source interface 1640 to access data source 1645. A data source is an information resource. As an example, a database of exceptions and rules may be a data source. Moreover, knowledge repositories and curated data may be other examples of data sources. In an example, the plurality of data domains 250 may be the data source 1645.

Figure 17:
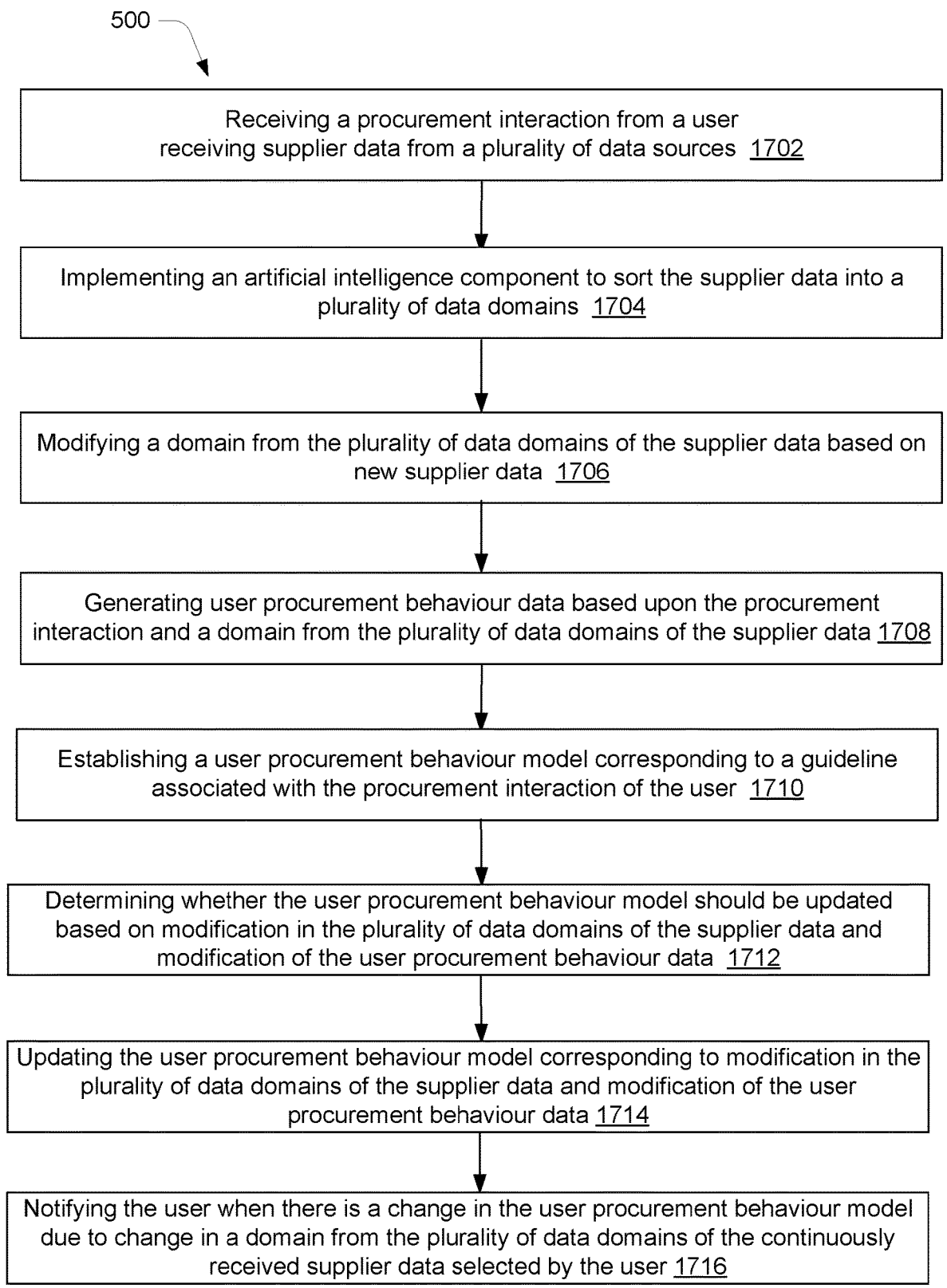
FIG. 17 illustrates a process flowchart for continuous sourcing, according to an example embodiment of the present disclosure.

FIG. 17 illustrates a method 1700 for cognitive procurement and proactive continuous sourcing according to an example embodiment of the present disclosure.

It should be understood that method steps are shown here for reference only and other combination of the steps may be possible. Further, the method 1700 may contain some steps in addition to the steps shown in the FIG. 17. For the sake of brevity, construction and operational features of the system 110 which are explained in detail in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15 and FIG. 16 are not explained in detail in the description of FIG. 17. The method 1700 may be performed by a component of the system 110, such as the processor 120, the modeler 130, the monitor 140, and the updater 150.

At block 1702, a procurement interaction may be received from a user. The procurement interaction may be received by the system 110. The procurement interaction to indicate a query sent by the user to the system for processing procurement of goods and services. In an example, the procurement interaction of the user further comprises at least one of screening a historical procurement requests, investigating a cost fluctuation, developing a requests for proposals, tracking a promotions, setting up a procurement recommendation, monitoring adherence to a procurement guidelines, and monitoring acquisition of a goods, services, or information. At block 1702, supplier data may be received from a plurality of data sources. In an example, the system 110 further comprises using the artificial intelligence component for researching at least one of a supplier availability, a supplier performance, a supplier capability, an, innovation assessment, a risk assessment, a technology assessment, and a supplier collaboration from the received supplier data.

At block 1704 an artificial intelligence component is implemented to sort the supplier data into a plurality of data domains. The artificial intelligence component may the artificial intelligence component 220.

At block 1706 a domain from the plurality of data domains of the supplier data is modified based on new supplier data. The new supplier data may be received continuously by the system 110.

At block 1708 user procurement behavior data is generated. The user procurement behavior data may be based upon the procurement interaction and a domain from the plurality of data domains of the supplier data. The procurement behavior data may be a domain from the plurality of data domains selected by the user specific to the procurement task.

At block 1710 a user procurement behavior model is established. The user procurement behavior model may be established corresponding to a guideline associated with the procurement interaction of the user by performing a cognitive learning operation on a domain from the plurality of data domains of the received supplier data and the received user procurement behavior data. In an example, the method comprises providing evidence supporting the user procurement behavior model made by performing the cognitive learning operation on a domain from the plurality of data domains of the received supplier data and the received user procurement behavior data.

At block 1712 determination whether the user procurement behavior model should be updated occurs. The determination may be based on modification in the plurality of data domains of the supplier data and modification of the user procurement behavior data.

At block 1714 the user procurement behavior model is updated. The updating may be corresponding to modification in the plurality of data domains of the supplier data and modification of the user procurement behavior data.

At block 1716 the user is notified when there is a change in the user procurement behavior model due to change in a domain from the plurality of data domains of the received supplier data selected by the user. In an example, the method 1700 may further comprise providing result of the procurement interaction of the user as a cognitive insight. The method 1700 further comprises implementing the cognitive insight provided for the procurement interaction. In an example, the method 1700 may be practised using a non-transitory computer readable medium. In an example, the method 1700 may be a computer implemented method.

The present disclosure provides for continuous collection and analysis of information and may also provide relevant recommendations on demand, allowing users to shift from event-based to continuous sourcing. The present disclosure may substantially reduce the time required in responding to market opportunities. The present disclosure for cognitive procurement and proactive continuous sourcing may eliminate substantial time spent on labor-intensive analysis, providing a huge boost in agility, responsiveness and productivity.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor; and
   a memory storing instructions, which when executed by the processor, cause the system to:
   receive supplier data from a plurality of data sources;
   implement an artificial intelligence component to analyse the supplier data into a plurality of data domains, wherein the supplier data is analysed to identify one or more parameters associated with the supplier;
   modify a domain from the plurality of data domains of the supplier data based on new supplier data, wherein a set of domains are selected from the plurality of data domains to identify clusters of suppliers that are associated with similar behavior pattern of the suppliers;

receive a procurement interaction from a user, the procurement interaction including a query sent by the user to the system for processing procurement of goods and services, wherein the procurement interaction includes at least one of screening historical procurement requests and generating new procurement requests;

generate user procurement behavior data based on the query sent by the user and a domain from the plurality of data domains of the supplier data, the procurement behavior data being a domain from the plurality of data domains selected by the user specific to the procurement interaction;

predict a user procurement behavior model corresponding to a guideline associated with the procurement interaction of the user through the artificial intelligence component by performing a cognitive learning operation on a domain from the plurality of data domains of the supplier data and the user procurement behavior data, wherein the guideline associated with the procurement interaction of the user is an interaction with a data source of suppliers from the plurality of data sources, wherein the cognitive operation includes identifying a pattern based on a preference of the user, and wherein the pattern leads to establishment of the predicted user procurement behavior model;

determine an actual user procurement behavior model specific to the procurement interaction, determine whether the predicted user procurement behavior model should be updated by determining a difference between the predicted user procurement behavior model and the actual behavior model based on a utility function; and in response to the determination that the difference between the predicted user procurement behavior model and the actual user procurement behavior model is greater than a threshold, update the predicted user procurement behavior model, wherein the updation of the predicted user procurement model is performed based on adjustment of one or more parameters associated with the predicted user procurement behavior model.

2. The system as claimed in claim 1, wherein the system is to generate an electronic document in response to the guideline associated with the procurement interaction of the user.

3. The system as claimed in claim 1, wherein the system is to research at least one of a supplier availability, a supplier performance, a supplier capability, an innovation assessment, a risk assessment, a technology assessment, and a supplier collaboration from the supplier data.

4. The system as claimed in claim 1, wherein the procurement interaction of the user further comprises at least one of investigating a cost fluctuation, tracking a promotions, setting up a procurement recommendation, monitoring adherence to a procurement guidelines, and monitoring acquisition of a goods, services, or information.

5. The system as claimed in claim 1, wherein the system is to provide a result of the procurement interaction of the user as a cognitive insight.

6. The system as claimed in claim 5, wherein the system is to implement the cognitive insight provided for the procurement interaction.

7. The system as claimed in claim 5, wherein the system is to associate the predicted user procurement behavior model with the cognitive insight.

8. The system as claimed in claim 1, wherein the system is to provide evidence supporting the predicted user procurement behavior model created by performing the cognitive learning operation on a domain from the plurality of data domains of the supplier data and the received user procurement behavior data.

9. A computer-implemented method, executed by at least one processor, the method comprising:

receiving a procurement interaction from user, the procurement interaction including a query sent by the user to the system for processing procurement of goods and services, wherein the procurement interaction includes at least one of screening historical procurement requests and generating new procurement requests;

receiving supplier data from a plurality of data sources;

implementing an artificial intelligence component to analyse the supplier data into a plurality of data domains, wherein the supplier data is analysed to identify one or more parameters associated with the supplier;

modifying a domain from the plurality of data domains of the supplier data based on new supplier data, wherein a set of domains are selected from the plurality of data domains to identify clusters of suppliers that are associated with similar behavior pattern;

generating user procurement behavior data based upon the query sent by the user and a domain from the plurality of data domains of the supplier data, the procurement behavior data being a domain from the plurality of data domains selected by the user specific to the procurement task;

predicting a user procurement behavior model corresponding to a guideline associated with the procurement interaction of the user through the artificial intelligence component by performing a cognitive learning operation on a domain from the plurality of data domains of the supplier data and the user procurement behavior data, wherein the guideline associated with the procurement interaction of the user is an interaction with a data source of suppliers from the plurality of data sources, wherein the cognitive operation includes identifying a pattern based on a preference of the user, and wherein the pattern leads to establishment of the predicted user procurement behavior model;

determining an actual user procurement behavior model specific to the procurement interaction, determining whether the predicted user procurement behavior model should be updated by determining a difference between the predicted user procurement behavior model and the actual behavior model based on a utility function; and in response to the determination that the difference between the predicted user procurement behavior model and the actual user procurement behavior model is greater than a threshold, updating the predicted user procurement behavior model, wherein the updation of the user procurement model is performed based on adjustment of one or more parameters associated with the user procurement behavior model.

10. The computer-implemented method as claimed in claim 9, wherein the method further comprises using the artificial intelligence component for researching at least one of a supplier availability, a supplier performance, a supplier capability, an, innovation assessment, a risk assessment, a technology assessment, and a supplier collaboration from the supplier data.

11. The computer-implemented method as claimed in claim 9, wherein the method further comprises providing result of the procurement interaction of the user as a cognitive insight.

12. The computer-implemented method as claimed in claim 11, wherein the method further comprises implementing the cognitive insight provided for the procurement interaction.

13. The computer-implemented method as claimed in claim 9, wherein the method further comprises providing evidence supporting the predicted user procurement behavior model made by performing the cognitive learning operation on a domain from the plurality of data domains of the supplier data and the received user procurement behavior data.

14. A non-transitory computer readable medium including machine readable instructions that are executable by a processor to:
- receive a procurement interaction from user, the procurement interaction including a query sent by the user to the system for processing procurement of goods and services, wherein the procurement interaction includes at least one of screening historical procurement requests and generating new procurement requests;
- receive supplier data from a plurality of data sources;
- implement an artificial intelligence component to analyse the supplier data into a plurality of domains, wherein the supplier data is analysed to identify one or more parameters associated with the supplier;
- modify a domain from the plurality of data domains of the supplier data based on new supplier data, wherein a set of domains are selected from the plurality of data domains to identify clusters of suppliers that are associated with similar behavior pattern;
- generate user procurement behavior data based on the query sent by the user and a domain from the plurality of data domains of the supplier data, the procurement behavior data being a domain from the plurality of data domains selected by the user specific to the procurement task;
- predict a user procurement behavior model corresponding to a guideline associated with the procurement interaction of the user through the artificial intelligence component by performing a cognitive learning operation on a domain from the plurality of data domains of the supplier data and the user procurement behavior data, wherein the guideline associated with the procurement interaction of the user is an interaction with a data source of suppliers from the plurality of data sources, wherein the cognitive operation includes identifying a pattern based on a preference of the user, and wherein the pattern leads to establishment of the predicted user procurement behavior model;
- determine an actual user procurement behavior model specific to the procurement interaction;
- determine whether the predicted user procurement behavior model should be updated by determining a difference between the predicted user procurement behavior model and the actual behavior model based on a utility function; and
- in response to the determination that the difference between the predicted user procurement behavior model and the actual user procurement behavior model is greater than a threshold, update the predicted user procurement behavior model, wherein the updation of the user procurement model is performed based on adjustment of one or more parameters associated with the user procurement behavior model.

15. The non-transitory computer readable medium of claim 14, wherein the processor is to research at least one of a supplier availability, a supplier performance, a supplier capability, an, innovation assessment, a risk assessment, a technology assessment, and a supplier collaboration from the supplier data.

16. The non-transitory computer readable medium of claim 14, wherein the procurement interaction of the user further comprises at least one of investigating a cost fluctuation, tracking a promotions, setting up a procurement recommendation, monitoring adherence to a procurement guidelines, and monitoring acquisition of a goods, services, or information.

17. The non-transitory computer readable medium of claim 14, wherein the processor is to provide result of the procurement interaction of the user as a cognitive insight.

18. The non-transitory computer readable medium of claim 17, wherein the processor is to implement the cognitive insight provided for the procurement interaction.

* * * * *